(12) United States Patent
Okada et al.

(10) Patent No.: US 6,393,461 B1
(45) Date of Patent: May 21, 2002

(54) COMMUNICATION MANAGEMENT SYSTEM FOR A CHAT SYSTEM

(75) Inventors: Sumiyo Okada; Masahiko Murakami; Yasuhide Matsumoto; Tatsuro Matsumoto; Kenichi Sasaki; Hidenobu Ito; Hitoshi Yamauchi, all of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/249,050

(22) Filed: Feb. 12, 1999

(30) Foreign Application Priority Data

Feb. 27, 1998 (JP) .......................................... 10-048101
Mar. 20, 1998 (JP) .......................................... 10-072884

(51) Int. Cl.[7] .............................................. G06F 15/16
(52) U.S. Cl. ..................... 709/204; 709/203; 709/205; 709/217
(58) Field of Search .................. 709/205, 250, 709/234, 204, 203, 217; 345/331, 332, 753, 758; 705/37; 707/100; 370/396

(56) References Cited

U.S. PATENT DOCUMENTS

| | | | | |
|---|---|---|---|---|
| 5,784,568 A | * | 7/1998 | Needham ..................... | 709/234 |
| 5,793,365 A | * | 8/1998 | Tang et al. .................. | 345/758 |
| 5,937,406 A | * | 8/1999 | Balabine et al. ............ | 707/100 |
| 5,956,491 A | * | 9/1999 | Marks ........................ | 709/250 |
| 6,014,136 A | * | 1/2000 | Ogasawara et al. ......... | 345/331 |
| 6,058,379 A | * | 5/2000 | Odom et al. ................. | 705/37 |
| 6,076,100 A | * | 6/2000 | Cottrille et al .............. | 709/203 |

FOREIGN PATENT DOCUMENTS

JP         10-190729        7/1998

* cited by examiner

Primary Examiner—Glenton B. Burgess
Assistant Examiner—Chuong Ho
(74) Attorney, Agent, or Firm—Staas & Halsey LLP

(57) ABSTRACT

A communication management system is adapted for a chat system provided in a computer network including a plurality of client workstations and a server computer linked thereto. The communication management system includes a log file recognizing part which recognizes recognizing a log file produced at a predetermined channel of the chat system during a chat session between the plurality of client workstations and the server computer even when the client workstation of concern is not connected to the channel of the chat system. A storage part stores the log file recognized by the log file recognizing part. A log file output part transmits the log file, stored by the storage part, through the computer network to an external communication device provided outside the chat system, when a log file request transmitted by the external communication device is received by the log file output part.

23 Claims, 28 Drawing Sheets

FIG. 6

```
400   410   420
10:19  <AAA > HELLO
10:19  <AAA > MAY I CHECK OUT?> ALL
10:19  >aaa//<YES>
10:21  <AAA > I CHECK OUT > ALL
10:41  <bbb > HERE IS THE PAMPHLET> "aaa"
10:41  <bbb > I FOUND LODGING IN THE PAMPHLET
10:41  >aaa//<I WILL GO//
11:00  <AAA > HELLO
11:00  <AAA > I CHECK IN AGAIN> ALL 13:09  <ccc > TODAY THE MEETING IS HELD IN ROOM 612
              FROM 1:30 P.M. TO 3:30 P.M.
13:09  <ccc > > ALL
```

FIG. 7

```
 400    410   420
09:23 *** ccc has joined channel #1
09:23 *** AAA has joined channel #1
10:02 *** ddd has joined channel #1
10:06 *** mul has joined channel #1
10:06 *** mul is now known as MUL
10:10 *** bbb has joined channel #1
10:19    <AAA > HELLO
10:19    <AAA > MAY I CHECK OUT?> ALL
10:19 > aaa < YES
10:21    <AAA > I CHECK OUT > ALL
10:41    <bbb > HERE IS  THE PAMPHLET > "aaa"
10:41    <bbb > I FOUND LODGING IN THE PAMPHLET
10:41 > aaa < I WILL GO
11:00    <AAA > HELLO
11:00    <AAA > I CHECK IN AGAIN> ALL
11:02 *** eee has joined channel #1
11:04 *** bbb has left IRC(Connection reset by peer)
11:09 *** bbb has joined channel #1
13:09    <ccc > TODAY THE MEETING IS HELD IN ROOM 612
               FROM 1:30 P.M. TO 3:30 P.M.
13:09    <ccc > ALL
13:15 *** ccc is now known as fff
```

FIG. 8

```
   400        410    420
09:23 *** ccc has joined channel #1
09:23 *** AAA has joined channel #1
10:02 *** ddd has joined channel #1
10:06 *** mul has joined channel #1
10:06 *** mul is now known as MUL
10:10 *** bbb has joined channel #1
10:19 <AAA> HELLO
10:19 <AAA> MAY I CHECK OUT?> ALL
10:19 > aaa <YES
10:21 <AAA> I CHECKOUT> ALL
10:41 <bbb> HERE IS THE PAMPHLET> "aaa"
10:41 <bbb> I FOUND LODGING IN THE PAMPHLET
10:41 > aaa <I WILL GO
11:00 <AAA> HELLO
11:00 <AAA> I CHECK IN AGAIN> ALL
11:02 *** eee has joined channel #1
11:04 *** bbb has left IRC (Connection reset by peer)
11:09 *** bbb has joined channel #1
13:09 <ccc> TODAY THE MEETING IS HELD IN ROOM 612
              FROM 1:30 P.M. TO 3:30 P.M.
13:09 <ccc> > ALL
13:15 *** ccc is now known as fff
```

FIG. 9

```
400   410    420
10:41  <#1:bbb> HERE IS THE PAMPHLET> "aaa"
10:51  <#2:MUL> MR. "aaa" , ARE YOU HERE?
11:00  <#1:AAA> I CHECK IN AGAIN> "aaa"
13:09  <#1:ccc> "aaa"
```

FIG. 10

```
400      410     420
09:23 *** ccc has joined channel #1
09:23 *** AAA has joined channel #1
10:02 *** ddd has joined channel #1
10:06 *** mul has joined channel #1
10:06 *** mul is now known as MUL
10:10 *** bbb has joined channel #1
10:19 <AAA> HELLO
10:19 <AAA> MAI I CHECKOUT? > ALL
10:19 > aaa  <YES
10:21 <AAA> I CHECK OUT > ALL
10:41 <bbb> HERE IS THE PAMPHLET> "aaa"
10:41 <bbb> I FOUND LODGING IN THE PAMPHLET
10:41 > aaa  <I WILL GO
11:00 <AAA> HELLO
11:00 <AAA> I CHECK IN AGAIN> ALL
11:02 *** eee has joined channel #1
11:04 *** bbb has left IRC (Connection reset by peer)
11:09 *** bbb has joined channel #1
13:09 <ccc> TODAY THE MEETING IS HELD IN ROMM 612
             FROM 1:30 P.M. TO 3:30 P.M.
13:09 <ccc> > ALL
13:15 *** ccc is now known as fff
```

FIG. 11

```
400   410   420
09:23 *** ccc has joined channel #1
09:23 *** AAA has joined channel #1
10:02 *** ddd has joined channel #1
10:06 *** mul has joined channel #1
10:06 *** mul is now known as MUL
10:10 *** bbb has joined channel #1
10:19  <AAA > HELLO
10:19  <AAA > MAY I CHECK OUT?> ALL
10:19  > aaa <YES
10:21  <AAA > I CHECK OUT > ALL
10:41  <bbb > HERE IS THE PAMPHLET> "aaa"
10:41  <bbb > I FOUND LODGING IN THE PAMPHLET
10:41  > aaa <I WILL GO
11:00  <AAA > HELLO
11:00  <AAA > I CHECK IN AGAIN> ALL
11:02 *** eee has joined channel #1
11:04 *** bbb has left IRC (Connection reset by peer)
11:09 *** bbb has joined channel #1
13:09  <ccc > TODAY THE MEETING IS HELD IN ROOM 612
              FROM 1:30 P.M. TO 3:30 P.M.
13:09  <ccc > > ALL
13:15 *** ccc is now known as fff
```

FIG. 12

```
400    410    420
 10:19  <AAA >  HELLO
 10:19  <AAA >  MAY I CHECK OUT?> ALL
 11:21  <AAA >  I CHECK OUT > ALL
 11:00  <AAA >  HELLO
 11:00  <AAA >  I CHECK OUT AGAIN > ALL
```

FIG. 16

```
500    510       520
15:20  <AAA>  A NEW COMPUTER HAS BEEN ON SALE
15:21  <BBB>  IT HAS MMX 300MHZ
15:22  <AAA>  WHAT CONFIGURATION DOES IT HAS?
15:50  <CCB>  PLEASE SEE http://www.fff.co.jp/ FOR DETAILS
15:22  <AAA>  I FOUND IT
```

FIG. 21

```
  500    510           520
15:20  <AAA>  THE WEATHER IS STILL SULYRY
15:21  <BBB>  CERTAINLY
16:00  *** CLIENT B HAS LEFT INTERNET RELAY CHAT (IRC)
16:11  <BBB>  WHAT DAY IS IT TOMORROW?
16:12  <AAA>  IT IS FRIDAY
```

FIG. 25

```
15:20  <AAA>  THE WEATHER IS STILL SULYRY
15:21  <EEE>  CERTAINLY
16:00  ***  "EEE" HAS LEFT INTERNET RELAY CHAT (IRC)
16:12  <AAA>  MR. "EEE", ARE YOU HERE?
16:12  <EEE_D>  CONNECTION WITH "EEE" IS OFF
```

500, 510, 520

```
15:20  <AAA > THE WEATHER IS STILL SULYRY
15:21  <EEE > CERTAINLY
16:12  <AAA > MR. "EEE", ARE YOU HERE?
16:12  <EEE_D > "EEE" HAS LEFT HIS WORKSTATION
```

```
500      510     520
 15:20   <AAA>   THE WEATHER IS STILL SULYRY
 15:21   <EEE>   CERTAINLY
 16:00   *** EEE HAS LEFT INTERNET RELAY CHAT (IRC)
 16:12   <AAA>   MR. "EEE" , ARE YOU HERE?
 16:12   <EEE_D> A MESSAGE IS STORED
 16:12   <EEE_D> PLEASE RECEIVE THE MESSAGE BY USING ***_****
```

COMMUNICATION MANAGEMENT SYSTEM FOR A CHAT SYSTEM

BACKGROUND OF THE INVENTION (1) Field of the Invention

The present invention relates to a communication management system for a chat system provided in a computer network including a plurality of client workstations and a server computer linked thereto.

Recently, with the increasing performance of computers and the wide use of computer networks, such as the Internet, joint communications over the computer network become widespread. As one of such efforts, a chat system in a computer network has come into wide use. The chat system provides talks or chats between plural users of workstations linked to the computer network in an easy-to-use manner in comparison with electronic mail. The chat system has a lot of future potential such as the question-and-answer meeting of plural users, the speedy preparation of the record of meetings, and so on.

(2) Description of the Related Art

In a conventional chat system, when a client workstation is connected to a predetermined channel of the conventional chat system during a chat session between a plurality of client workstations and a server computer, the user is able to view the contents of talks or chats in the chat session on a monitor of the client workstation in real time. In addition, a log file containing chat records is produced when the client workstation is connected to the channel of the chat system, the user is able to store the log file in a memory of the client workstation so that the user can later view the contents of the stored file.

However, in the conventional chat system, when the client workstation of concern is not connected to the channel of the chat system or the power switch is off during a chat session, the user is unable to view the contents of a log file produced during the chat session.

Further, in the conventional chat system, when a user of the client workstation of concern is unable to transmit an answer message to a communication device when a record of a recognized log file matches the previously stored conditions and the client workstation of concern is not connected to the channel of the chat system.

SUMMARY OF THE INVENTION

An object of the present invention is to provide an improved communication management system in which the above-mentioned problems are eliminated.

Another object of the present invention is to provide a communication management system for a chat system which enables the user to view a log file produced when the client workstation of concern is not connected to the channel of the chat system, by using an external communication device provided outside the chat system and outputting the log file to the external communication device.

Still another object of the present invention is to provide a communication management system for a chat system which enables the user to transmit a predetermined message to a communication device when a record of a recognized log file matches the previously stored conditions and the client workstation of concern is not connected to the channel of the chat system.

The above-mentioned objects of the present invention are achieved by a communication management system for a chat system provided in a computer network including a plurality of client workstations and a server computer linked thereto, which includes: a log file recognizing part which recognizes a log file produced at a predetermined channel of the chat system during a chat session between the plurality of client workstations and the server computer even when the client workstation of concern is not connected to the predetermined channel of the chat system; a storage part which stores the log file recognized by the log file recognizing part; and a log file output part which transmits the log file, stored by the storage part, through the computer network to an external communication device provided outside the chat system, when a log file request transmitted by the external communication device is received by the log file output part.

The above-mentioned objects of the present invention are achieved by a communication management system for a chat system provided in a computer network including a plurality of client workstations and a server computer linked thereto, which includes: a log file recognizing part which recognizes a log file produced at a predetermined channel of the chat system during a chat session between the plurality of client workstations and the server computer even when the client workstation of concern is not connected to the predetermined channel of the chat system; a storage part which stores the log file recognized by the log file recognizing part; a record reading part which reads records from the log file stored by the storage part, when the records match previously stored conditions; and a log file output part which establishes a connection with a communication device when the records are read by the record reading part, and transmits a log file containing the read records, through the computer network to the communication device.

In the communication management system of a preferred embodiment of the present invention, it is possible that the user views a log file produced when the client workstation of the user is not connected to the channel of the chat system, by using the external communication device provided outside the chat system and outputting the log file to the external communication device. Further, it is possible that the user receives the log file in a desired form by transmitting the output conditions with selected options to the log file output part. Further, the communication management system of the present embodiment can provide easy understanding of the contents of talks of each of the individual users in a distinctive manner.

Further, in the communication management system of a preferred embodiment of the present invention, it is possible that the user of the client workstation of concern recognizes a message from the sending user when a record of the recognized log file matches the previously stored conditions and the client workstation of concern is not connected to the channel of the chat system. The communication management system of the present embodiment can provide increased convenience for the plural users when using the chat system.

BRIEF DESCRIPTION OF THE DRAWINGS

Other objects, features and advantages of the present invention will be more apparent from the following detailed description when read in conjunction with the accompanying drawings in which:

FIG. 6 is a diagram of an example of a processed log file in which chat records have different colors depending on individual usernames of the records;

FIG. 7 is a diagram of an example of a processed log file in which chat records have different fonts depending on individual usernames of the records;

FIG. 8 is a diagram of an example of a processed log file when selection criteria including a specific character string and the number of selection records before and after a record containing the specific character string are set;

FIG. 9 is a diagram of an example of a processed log file when selection criteria including a specific character string are set;

FIG. 10 is a diagram of an example of a processed log file when selection criteria including a specific time period are set;

FIG. 11 is a diagram of an example of a processed log file when selection criteria including a specific chat channel are set;

FIG. 12 is a diagram of an example of a processed log file when selection criteria including a specific username are set;

FIG. 16 is a diagram of an example of a log file produced by a chat system;

FIG. 21 is a diagram of an example of a log file produced by the chat system;

FIG. 25 is a diagram of an example of a processed log file output by the communication management system of FIG. 24;

FIG. 28 is a diagram of an example of a processed log file output by the communication management system of FIG. 27.

DESCRIPTION OF THE PREFERRED EMBODIMENTS

A description will now be given of the preferred embodiments of the present invention with reference to the accompanying drawings.

Figure 1:
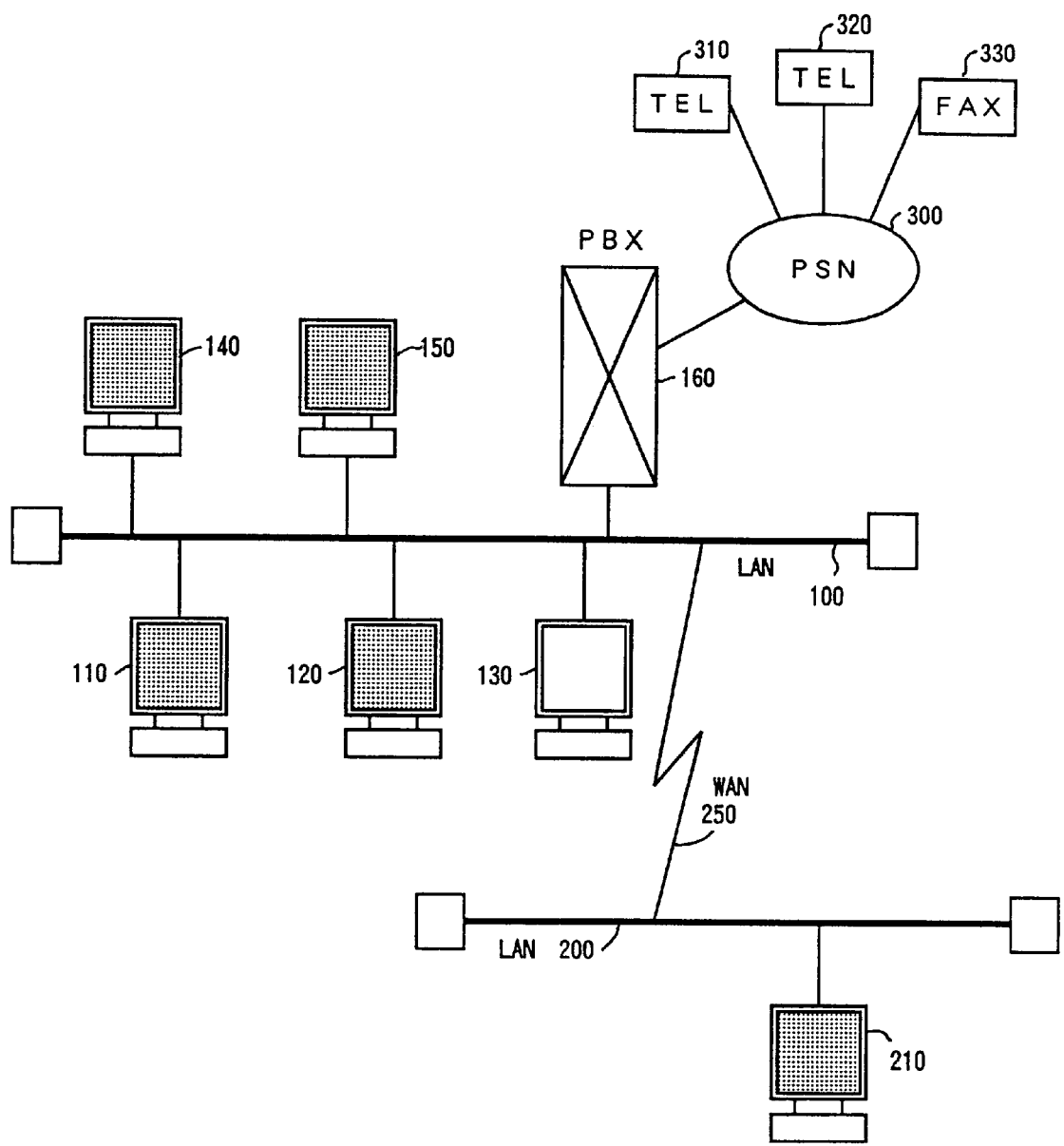
FIG. 1 is a diagram of a computer network to which a communication management system embodying the present invention is applied.

FIG. 1 shows a computer network to which a communication management system embodying the present invention is applied.

As shown in FIG. 1, the computer network, which is a local area network (LAN) 100, includes a plurality of client workstations 110, 120 and 130, a server computer 140, and an agent computer 150 which are linked together. These computers of the LAN 100 are connected through a private branch exchange (PBX) 160 to a public switched network (PSN) 300. A telephone (TEL) 310, a telephone (TEL) 320 and a facsimile (FAX) 330 are connected through the PSN 300 to the PBX 160 of the LAN 100.

In the computer network of FIG. 1, the LAN 100 is connected through a wide area network (WAN) 250 to a local area network (LAN) 200. The LAN 200 includes a log file output computer 210 linked thereto.

The computer network of FIG. 1 is illustrated to give a typical example of the configuration of the computer network to which the present invention is applied. However, the present invention is not limited to a particular configuration of the computer network of FIG. 1. It is a matter of course that the present invention is also applicable to a different computer network in which the number of LANs, the number of computers, the number of telephones, the connections thereof, and others are modified.

A chat system is provided in, for example, the computer network of FIG. 1, and enables a user of the client workstation of concern linked to the computer network to carry out a chat among plural users of the other client workstations and the server computer. The communication management system embodying the present invention is applied to the chat system.

The chat system provides a plurality of channels. For example, a user of the client workstation 110, which is connected to a certain channel of the chat system, can view on a monitor of the workstation 110 the contents of the chat among the client workstations which are connected to the same channel of the chat system. During the chat session, the user of the client workstation 110 inputs text indicating his own talks, using an input device of the client workstation 110, and the text input by the user is transmitted through the computer network to all the client workstations connected to the same channel of the chat system.

The chat system produces a log file at a predetermined channel of the chat system during a chat session between the plurality of client workstations and the server computer, and chat records of the log file are sequentially displayed on the monitor of the client workstation of concern on the order of receiving of the chat records at the client workstation of concern.

Figure 2:
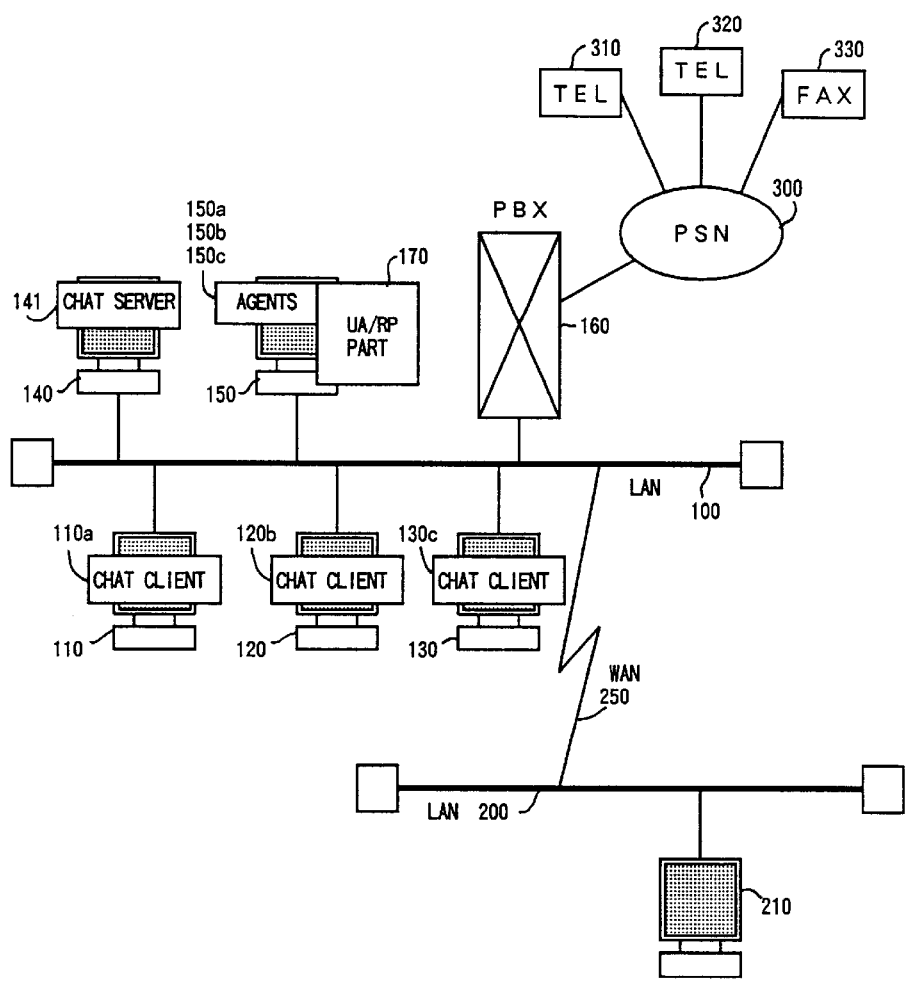
FIG. 2 is a diagram of the computer network in which the elements of the communication management system are incorporated.

FIG. 2 shows the computer network in which the elements of the communication management system of the present embodiment are incorporated.

As shown in FIG. 2, in the communication management system of the present embodiment, the server computer 140 acts as a chat server 141 of the chat system, the agent computer 150 acts as agents 150a, 150b and 150c of the chat system, and the plurality of client workstations 110, 120 and 130 act as chat clients 110a, 120b and 130c of the chat system. There is the one-to-one correspondence between the agents 150a, 150b and 150c of the agent computer 150 and the chat clients 110a, 120b and 130c of the client workstations 110, 120 and 130.

In the chat system, the agents 150a, 150b and 150c function to manage the transmission and receiving of information between the chat server 141 and the chat clients 110a, 120b and 130c.

As shown in FIG. 2, in the communication management system of the present embodiment, the agent computer 150 includes a user-authetication/record-processing part 170 (hereinafter, called the UA/RP part 170) which is provided in the agent computer 150. The UA/RP part 170 performs an authentication of a user of an external communication device (for example, the telephone 310 or the client workstation 110), provided outside the chat system, before transmitting a log file to the external communication device. Further, the UA/RP part 170 processes the log file in accordance with output conditions transmitted by the external communication device, and transmits the processed log file through the computer network to the external communication device (for example, the facsimile 330 or the computer 210). Various types of the processed log file output by the UA/RP part 170 will be described below.

In the embodiment of FIG. 2, the UA/RP part 170 is provided in the agent computer 150 linked to the computer network. However, according to the communication management system of the present invention, the UA/RP part 170 may be provided in the server computer 140 or any of the client workstations 110, 120 and 130. Alternatively, the UA/RP part 170 may be provided in a dedicated workstation independently linked to the computer network. Further, in the embodiment of FIG. 2, the agents 150a, 150b and 150c of the chat system are provided in the agent computer 150. However, according to the communication management system of the present invention, the agents 150a, 150b and 150c may be provided in the server computer 140 or any of the client workstations 110, 120 and 130.

Figure 3:
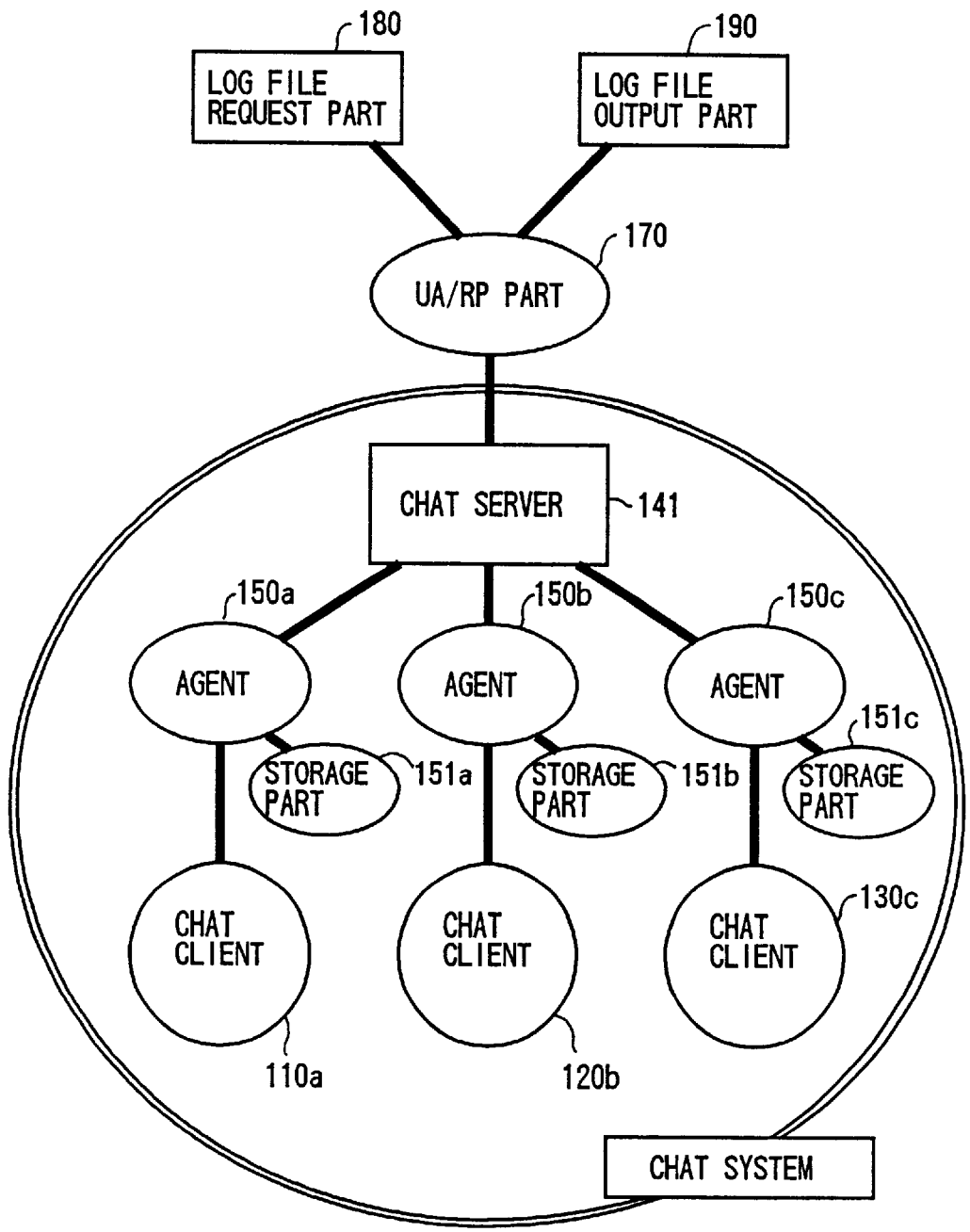
FIG. 3 is a diagram for explaining the principle of the communication management system of the present embodiment.

FIG. 3 is a diagram for explaining the principle of the communication management system of the present embodiment.

As shown in FIG. 3, the chat clients 110a, 120b and 130c are connected through the agents 150a, 150b and 150c, respectively, to the chat server 141. The agent 150a, the agent 150b and the agent 150c include a storage part 151a, a storage part 151b and a storage part 151c, respectively.

Each of the agents 150a, 150b and 150c recognizes a log file produced at a predetermined channel of the chat system during a chat session between the client workstations 110, 120 and 130 and the server computer 140, regardless of whether the client workstation of concern is connected to the channel of the chat system or not. Each of the agents 150a, 150b and 150c stores the recognized log file in a corresponding one of the storage parts 151a, 151b and 151c.

Hence, even when the client workstation of concern is not connected to the channel of the chat system, the log file recognized by each agent is retained in the storage parts 151a, 151b and 151c. Each of the agents 150a, 150b and 150c has predetermined setting conditions which define a location of the chat server 141 and the predetermined channel of the chat system.

Further, in the communication management system of the present embodiment, a log file request part 180 and a log file output part 190 are provided. As shown in FIG. 3, the log file request part 180 and the log file output part 190 are connected through the UA/RP part 170 to the chat server 141. These parts will be described below.

Figure 4:
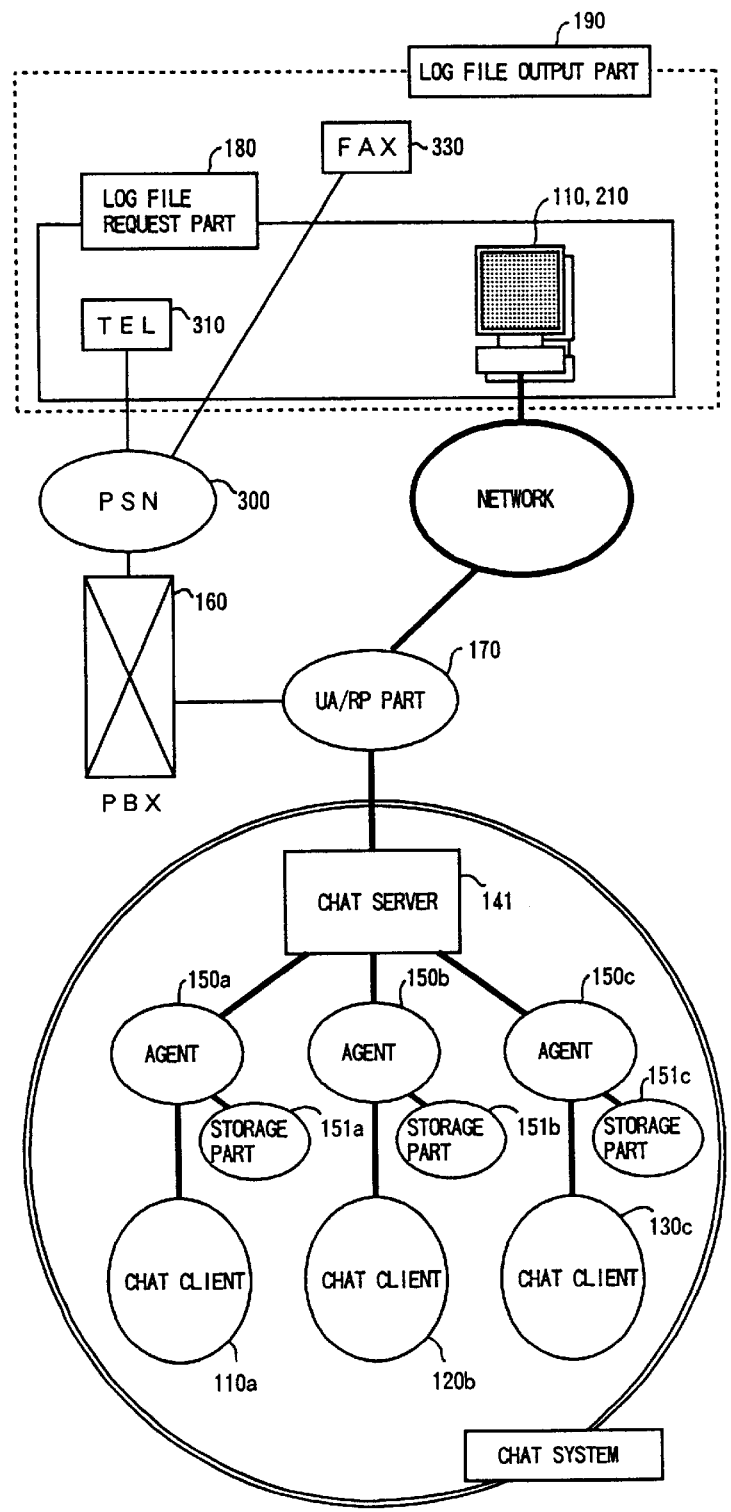
FIG. 4 is a diagram for explaining a configuration of the communication management system of the present embodiment.

FIG. 4 shows a configuration of the communication management system of the present embodiment. In FIG. 4, there is illustrated the communication management system of the present embodiment wherein the log file request part 180 and the log file output part 190 are specifically configured.

In the communication management system according to the present invention, the log file request part 180 transmits a log file request to the chat system so that the chat system is instructed to transmit the log file to the external communication device (or the log file output part 190). The log file output part 190 receives the log file transmitted by the chat system.

As shown in FIG. 4, in the communication management system of the present embodiment, the log file request part 180 may be configured by one of the telephone 310 and the client workstation 110. The log file output part 190 may be configured by one of the telephone 310, the facsimile 330, the client workstation 110 and the log file output computer 210.

Therefore, according to the communication management system of the present embodiment, it is possible for the user to use either the telephone 310 or the client workstation 110 as the log file request part 180 that transmits the log file request to the chat system. Further, it is possible for the user to use any one of the telephone 310, the facsimile 330, the client workstation 110 and the log file output computer 210 as the log file output part 190 that receives the log file from the chat system.

Figure 5:
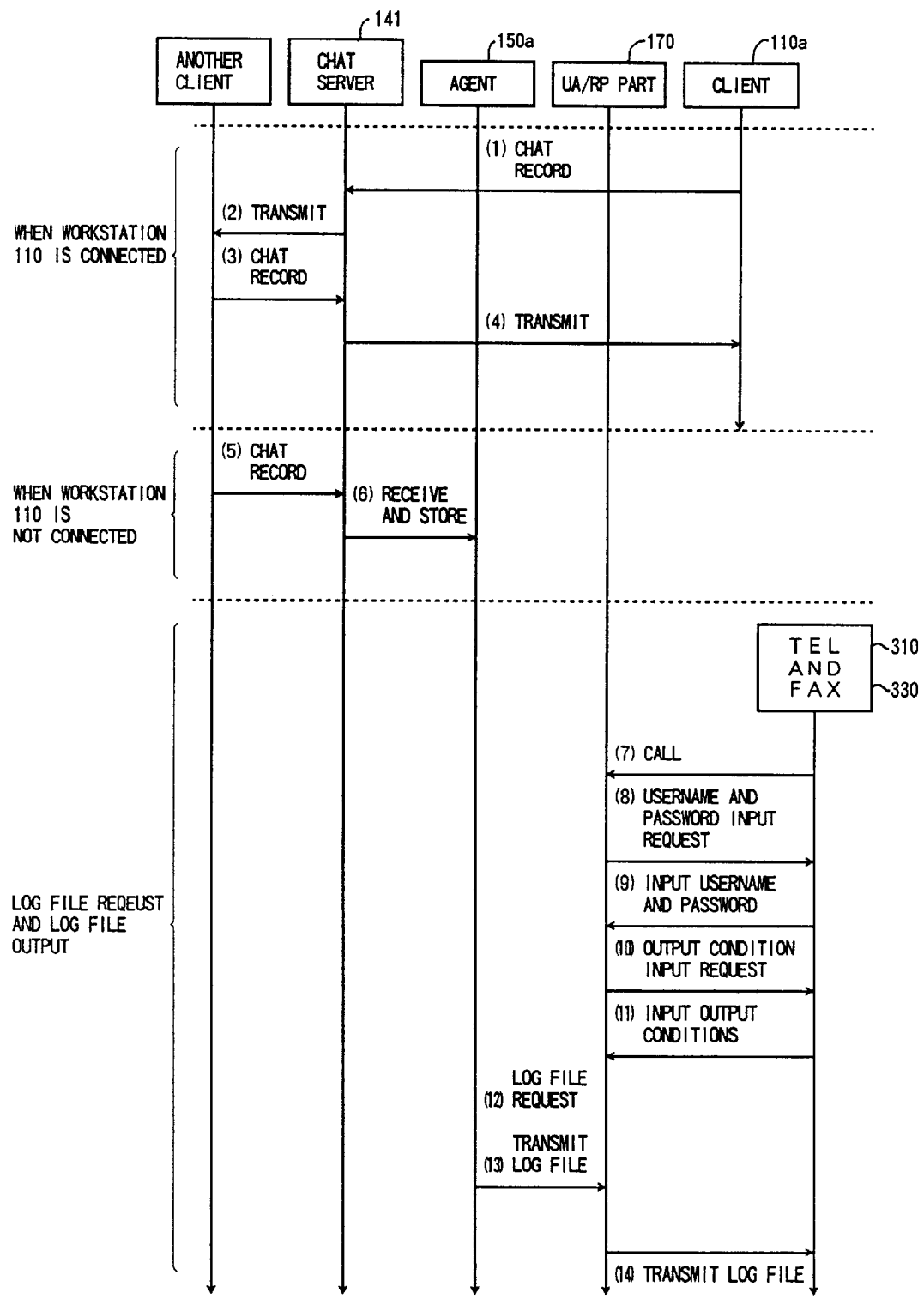
FIG. 5 is a diagram for explaining communication sequences of the communication management system of the present embodiment.

Next, FIG. 5 is a diagram for explaining communication sequences of the communication management system of the present embodiment.

As shown in FIG. 5, the arrows (1) through (4) illustrate a communication sequence of the communication management system of the present embodiment when the client workstation 110 is connected to a predetermined channel of the chat system, and a chat between the user of the client workstation 110 and the user of another client workstation is carried out through the communication sequence.

As indicated by the arrow (1), the user of the client workstation 110 (or the chat client 110a) inputs text indicating his own talks, using the input device of the client workstation 110, and a chat record including the input text is transmitted through the computer network to the chat server 141 of the server computer 140. As indicated by the arrow (2), the chat server 141 transmits the chat record to all the client workstations connected to the same channel of the chat system.

As indicated by the arrow (3), another chat client (for example, the user of the client workstation 120) inputs text indicating his own talks, using the input device of the client workstation, and a chat record including the input text is transmitted through the computer network to the chat server 141. As indicated by the arrow (4), the chat server 141 transmits the chat record to all the client workstations connected to the same channel of the chat system.

On the other hand, the arrows (5) and (6) in FIG. 5 illustrate a communication sequence of the communication management system of the present embodiment when the client workstation 110 is not connected to the channel of the chat system, and a chat between the chat server 141 and the user of another client workstation is carried out through the communication sequence.

As indicated by the arrow (5), another chat client (for example, the user of the client workstation 120) inputs text indicating his own talks, using the input device of the client workstation, and a chat record including the input text is transmitted through the computer network to the chat server 141. As indicated by the arrow (6), the chat record transmitted by the chat server 141 is received by the agent 150a and stored in the storage part 151a by the agent 150a because the client workstation 110 is currently not connected to the channel of the chat system.

Further, the arrows (7) through (14) in FIG. 5 illustrate a communication sequence of the communication management system of the present embodiment when a user of the external communication device (for example, the telephone 310) issues a log file request to the chat system.

As indicated by the arrow (7), the user of the telephone 310 calls the UA/RP part 170 of the agent computer 150 through the PSN 300 and the PBX 160. The communication management system of the present embodiment is initiated by this call. As indicated by the arrow (8), the UA/RP part 170 transmits a request for input of a username and a password, to the telephone 310.

As indicated by the arrow (9), the user of the telephone 310 inputs a specific username and password for his exclusive use by using pushbuttons of the telephone 310 in response to the request transmitted by the UA/RP part 170. Suppose that the username and password input at this time is a combination of numerics and symbols that can be input by the pushbuttons of the telephone 310, and the username and password for the user's exclusive use is recorded, in advance, in the US/RP part 170.

The UA/RP part 170 determines whether the username and password input by the telephone 310 matches the recorded username and password. When it is determined that the input username and password does not match the recorded username and password, the UA/RP part 170 transmits a synthesized voice signal, indicative of rejection of the log file request because of the input username and password, to the telephone 310. Hence, the user of the telephone 310 is notified by the synthesized voice signal that the log file request is rejected because of the input username and password.

When it is determined that the input username and password matches the recorded username and password, the authentication of the user is terminated by the UA/RP part 170. As indicated by the arrow (10) in FIG. 5, the UA/RP part 170 transmits a request for input of the output conditions for the log file, to the telephone 310.

As indicated by the arrow (11), the user of the telephone 310 selects desired options of the output conditions for the log file by using the pushbuttons of the telephone 310, in response to the request transmitted by the UA/RP part 170. The selected options of the output conditions for the log file are transmitted to the US/RP part 170, in order to determine the form of the log file to be output to the external communication device. The UA/RP part 170 processes the log file in accordance with the output conditions transmitted by the telephone 310, and transmits the processed log file to the external communication device. Hence, it is possible for the user to receive the log file in the desired form by transmitting the output conditions with the selected options.

More specifically, in the communication management system of the present embodiment, the procedures indicated by the arrows (10) and (11) in FIG. 5 are performed as follows.

After the end of the authentication of the user, the UA/RP part 170 transmits as a first input request a synthesized voice signal indicating which of options of the log file transmission method is selected by the user, to the telephone 310. The synthesized voice signal indicates, for example, that if the transmission of the log file by voice is selected, the user is requested to press the pushbutton "1"; if the transmission of the log file by facsimile is selected, the user is requested to press the pushbutton "2"; if the transmission of the log file by electronic mail is selected, the user is requested to press the pushbutton "3"; if the cancellation of the log file request is desired, the user is requested to press the pushbutton "0".

For example, when the pushbutton "2" is pressed by the user to select the transmission of the log file by facsimile, the UA/RP part 170 transmits as a second input request a synthesized voice signal indicating that the user is requested to input a facsimile number of the external communication device (or the facsimile 330), to the telephone 310.

Alternatively, when the pushbutton "3" is pressed by the user to select the transmission of the log file by electronic mail, the UA/RP part 170 transmits as the second input request a synthesized voice signal indicating that the user is requested to input a mail address of the external communication device (or the computer 210), to the telephone 310.

When the second input request related to the facsimile number, transmitted by the UA/RP part 170, is received, the user of the telephone 310 inputs the facsimile number of the external communication device.

After the log file transmission method is determined, the UA/RP part 170 transmits a synthesized voice signal indicating that the user is requested to input a selection of the name of a chat server related to the log file, to the telephone 310. The synthesized voice signal indicates, for example, that if the output of the log file from a chat server A is selected, the user is requested to press the pushbutton "1"; if the output of the log file from a chat server B is selected, the user is requested to press the pushbutton "2"; if the cancellation of the log file request is desired, the user is requested to press the pushbutton "3".

The user of the telephone 310 inputs the selection of the name of the chat server related to the log file in response to the request transmitted by the UA/RP part 170.

After the selection of the name of the chat server is performed, the UA/RP part 170 transmits a synthesized voice signal indicating that the user is requested to input a selection of the name of a chat channel related to the log file, to the telephone 310. The synthesized voice signal indicates, for example, that if the output of the log file related to a chat channel#1 is selected, the user is requested to press the pushbutton "1"; if the output of the log file related to a chat channel#2 is selected, the user is requested to press the pushbutton "2"; if the output of the log file related to a chat channel#3 is selected, the user is requested to press the pushbutton "3"; if the cancellation of the log file request is desired, the user is requested to press the pushbutton "0".

The user of the telephone 310 inputs the selection of the name of the chat channel related to the log file in response to the request transmitted by the UA/RP part 170.

After the selection of the name of the chat channel is performed, the UA/RP part 170 transmits a synthesized voice signal indicating that the user is requested to input a selection of a date designation option related to the log file, to the telephone 310. The synthesized voice signal indicates, for example, that if the date designation option related to the log file is selected, the user is requested to press the pushbutton "1"; if the date designation option is not desired, the user is requested to press the pushbutton "0"

When the pushbutton "1" is pressed by the user to select the date designation option, the UA/RP part 170 transmits a synthesized voice signal indicating that the user is requested to input a date designation related to the log file, to the telephone 310. On the other hand, when the pushbutton "0" is pressed by the user not to select the date designation option, the UA/RP part 170 determines that the log file of the date on which the log file request is made is selected.

After the selection of the date designation option related to the log file is performed, the UA/RP part 170 transmits a synthesized voice signal indicating that the user is requested to input a selection of a time designation option related to the log file, to the telephone 310. The synthesized voice signal indicates, for example, that if the time designation option related to the log file is selected, the user is requested to press the pushbutton "1"; if the time designation option is not desired, the user is requested to press the pushbutton "0".

When the pushbutton "1" is pressed by the user to select the time designation option, the UA/RP part 170 transmits a synthesized voice signal indicating that the user is requested to input a time period related to the log file, to the telephone 310. On the other hand, when the pushbutton "0" is pressed by the user not to select the time designation option, the UA/RP part 170 determines that all the chat records of the log file all the day the log file request is made are selected. Alternatively, how the UA/RP part 170 determines the output conditions of the log file when the date/time designation option is not selected may be arbitrarily preset by the user.

After the selection of the time designation option related to the log file is performed, the UA/RP part 170 transmits a synthesized voice signal indicating that the user is requested to input a selection of a username designation option related to the log file, to the telephone 310. The synthesized voice signal indicates, for example, that if the username designation option related to the log file is selected, the user is requested to press the pushbutton "1"; if the username designation option is not desired, the user is requested to press the pushbutton "2". When the username designation option is selected, the US/RP part 170 processes the log file such that the processed log file includes the chat records which are transmitted by a specific user.

When the pushbutton "1" is pressed by the user to select the username designation option, the UA/RP part 170 transmits a synthesized voice signal indicating that the user is requested to input a specific username related to the log file, to the telephone 310. Suppose that the username, input at this time is a combination of numerics and symbols that can be input by the pushbuttons of the telephone 310, and the username is recorded, in advance, in the US/RP part 170. On the other hand, when the pushbutton "0" is pressed by the user not to select the username designation option, the UA/RP part 170 determines that all the chat records of the log file all the day the log file request is made are selected. Alternatively, how the UA/RP part 170 determines the output conditions of the log file when the username designation option is not selected may be arbitrarily preset by the user.

After the procedures indicated by the arrows (10) and (11) in FIG. 5 are performed, the UA/RP part 170 transmits the log file request to the agent 150a as indicated by the arrow (12).

As indicated by the arrow (13), the agent 150a reads the relevant log file from the storage part 151a in response to the log file request, and transmits the log file to the UA/RP part 170. As indicated by the arrow (14), the UA/RP part 170 processes the log file in accordance with the output conditions transmitted by the telephone 310, and transmits the processed log file to the external communication device (for example, the facsimile 330) in accordance with the output conditions.

According to the communication management system of the present invention, it is possible that the UA/RP part 170 outputs various types of the processed log file in accordance with the desired selections of the output conditions by the user.

Next, a description will be given of various examples of the processed log file output by the communication management system of the present embodiment to the external communication device (the facsimile 330 or the log file output computer 210) with reference to FIG. 6 through FIG. 12.

In FIG. 6 through FIG. 12, each of the chart records in the processed log file includes a chat time field 400, a username (or nickname) field 410 and a chat text field 420. The UA/RP part 170 of the communication management system processes the log file in accordance with the output conditions transmitted by the external communication device (for example, the facsimile 330 or the log file output computer 210). As shown in FIG. 6 through FIG. 12, the communication management system of the present embodiment is capable of outputting various types of the processed log file to the external communication device.

FIG. 6 shows an example of a processed log file in which chat records have different colors depending on individual usernames of the records. Suppose that the boldface, the shade, the mesh and the normal patterns, representing the individual chat records in FIG. 6, denote that the records have different colors depending on the usernames of the records.

When the processed log file of the type shown in FIG. 6 is output, it is possible that the communication management system of the present embodiment provide easy understanding of the contents of the talks of each of the individual users in a distinctive manner.

FIG. 7 shows an example of a processed log file in which chat records have different fonts depending on individual usernames of the records. Suppose that the boldface, the oblique face, the mesh and the normal patterns, representing the individual chat records in FIG. 7, denote that the records have different fonts or character sizes depending on the usernames of the records.

When the processed log file of the type shown in FIG. 7 is output, it is possible that the communication management system of the present embodiment provide easy understanding of the contents of the talks of each of the individual users in a distinctive manner.

FIG. 8 shows an example of a processed log file when selection criteria including a specific character string and the number of selection records before and after a record containing the specific character string are set.

In the example of FIG. 8, the UA/RP part 170 of the communication management system sets the selection criteria which include the specific character string (or "aaa" in this example) and the number of selection records (or ten selection records in this example) before and after the record containing the specific character string, based on the output conditions transmitted by the external communication device.

When the processed log file of the type shown in FIG. 8 is output, it is possible that the communication management system of the present embodiment provide speedy search for the record containing the specific character string in the log file and easy understanding of the contents of the talks of the individual users before and after the record containing the specific character string.

FIG. 9 shows an example of a processed log file when the selection criteria including a specific character string are set.

In the example of FIG. 9, the UA/RP part 170 of the communication management system sets the selection criteria which include the specific character string (or "aaa" in this example) based on the output conditions transmitted by the external communication device. The UA/RP part 170 of the communication management system outputs all the chat records in the log file that contain the specific character string.

When the processed log file of the type shown in FIG. 9 is output, it is possible that the communication management system of the present embodiment provide speedy search for the record containing the specific character string in the log file and easy understanding of the contents of the chat records containing the specific character string.

FIG. 10 shows an example of a processed log file when the selection criteria including a specific time period are set.

In the example of FIG. 10, the UA/RP part 170 of the communication management system sets the selection criteria which include the specific time period (or "from 9:00 to 13:15" in this example) based on the output conditions transmitted by the external communication device. The UA/RP part 170 of the communication management system outputs all the chat records in the log file that are produced within the specific time period.

When the processed log file of the type shown in FIG. 10 is output, it is possible that the communication management system of the present embodiment provide easy understanding of the contents of the chat records of the log file even if the log file is produced during such a time that the client workstation of concern is not connected to the channel of the chat system.

FIG. 11 shows an example of a processed log file when the selection criteria including a specific chat channel are set.

In the example of FIG. 11, the UA/RP part 170 of the communication management system sets the selection criteria which include the specific chat channel (or "channel #1" in this example) based on the output conditions transmitted by the external communication device. The UA/RP part 170 of the communication management system outputs all the chat records in the log file that are produced at the specific chat channel of the chat system.

When the processed log file of the type shown in FIG. 11 is output, it is possible that the communication management system of the present embodiment provide easy understanding of the contents of the chat records of the log file which is produced at a desired channel of the chat system.

FIG. 12 shows an example of a processed log file when the selection criteria including a specific username are set.

In the example of FIG. 12, the UA/RP part 170 of the communication management system sets the selection criteria which include the specific username (or "AAA" in this example) based on the output conditions transmitted by the external communication device. The UA/RP part 170 of the communication management system outputs all the chat records in the log file that are transmitted by the specific user.

When the processed log file of the type shown in FIG. 12 is output, it is possible that the communication management system of the present embodiment provide easy understanding of the contents of the chat records in the log file which are transmitted by the specific user.

Next, a description will be given of other preferred embodiments of the communication management system of the present invention which are adapted to enable the user to transmit a predetermined message to a communication device when a record of a recognized log file matches previously stored conditions and the client workstation of concern is not connected to the channel of the chat system.

As described above, the chat system is provided in a computer network, and enables a user of the client workstation of concern linked to the computer network to carry out a chat among plural users of the other client workstations and the server computer.

The chat system provides a plurality of channels. For example, a user of the client workstation of concern, which is connected to a certain channel of the chat system, can view on a monitor of that workstation the contents of the chat among the client workstations which are connected to the same channel of the chat system. During the chat session, the user of the client workstation of concern inputs text indicating his own talks, using an input device of that workstation, and the text input by the user is transmitted through the computer network to all the client workstations connected to the same channel of the chat system.

The chat system produces a log file at a predetermined channel of the chat system during a chat session between the plurality of client workstations and the server computer, and chat records of the log file are sequentially displayed on the monitor of the client workstation of concern on the order of receiving of the chat records at the client workstation of concern.

Accordingly, the plural users of the client workstations at remote locations on the computer network can transmit and receive in real time text-base information of their talks during the chat session provided by the chat system.

Figure 13:
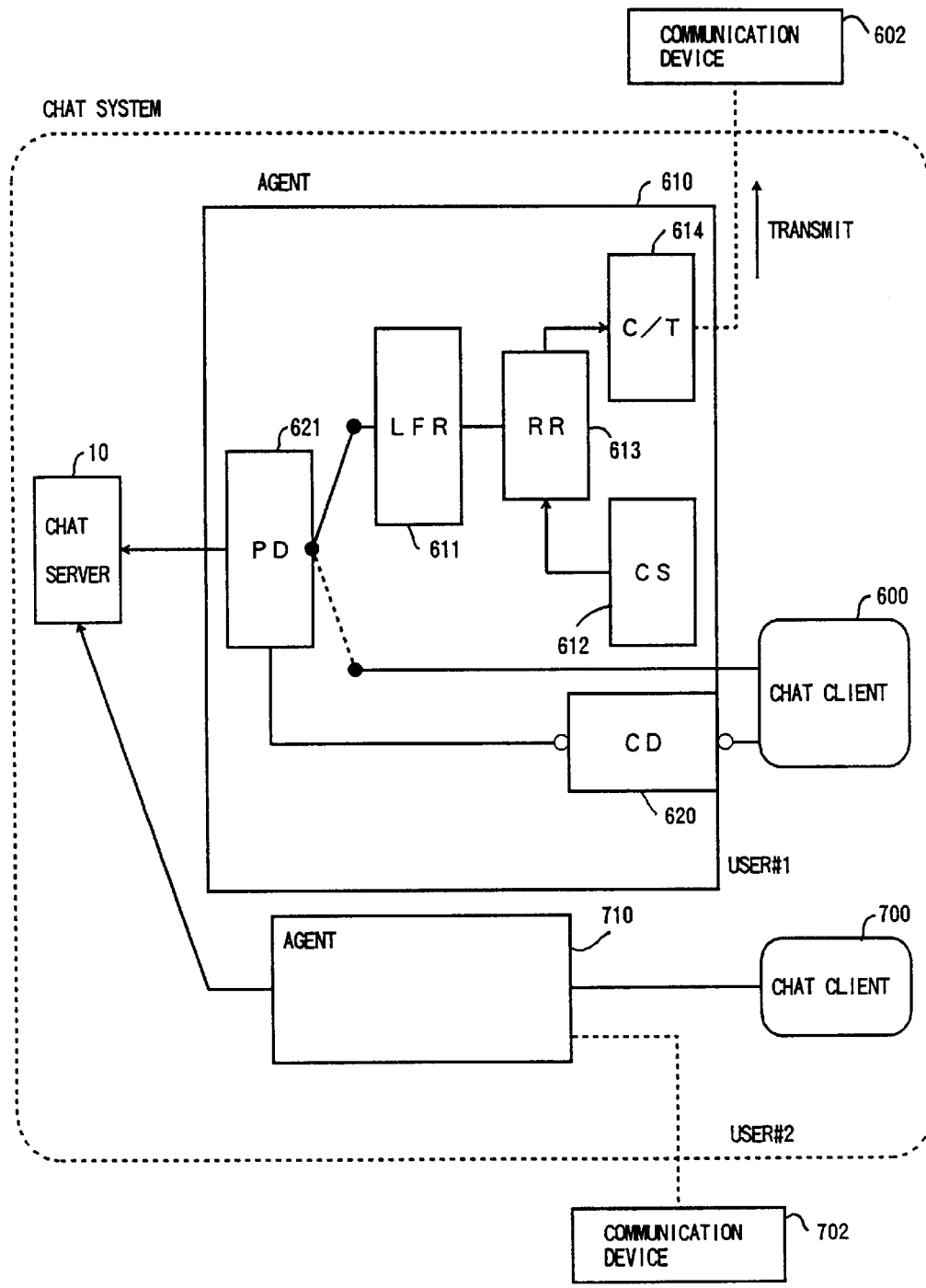
FIG. 13 is a diagram for explaining a configuration of a communication management system embodying the present invention.

FIG. 13 shows a configuration of a communication management system embodying the present invention. The communication management system of the present embodiment is applied to the chat system.

As shown in FIG. 13, an agent 610 and an agent 710 are both connected to a chat server 10. A chat client 600 is connected through the agent 610 to the chat server 10, and a chat client 700 is connected through the agent 710 to the chat server 10.

Further, in the communication management system of FIG. 13, a communication device 602 and a communication device 702 are provided outside the chat system. When previously stored conditions (which will be described later) are met, the agent 610 establishes a connection with the communication device 602, and transmits a log file to the communication device 602. Similarly, when previously stored conditions are met, the agent 710 establishes a connection with the communication device 702, and transmits a log file to the communication device 702.

Suppose that a user#1 of the chat client 600 is capable of using the communication device 602 on some occasion, and a user#2 of the chat client is capable of using the communication device 702 on some occasion. The chat server 10 manages the communication control of the chat system. All the talks of the users produced in the chat system are transmitted to the chat clients through the chat server 10.

Each of the agents 610 and 710 recognizes a log file produced at a predetermined channel of the chat system during a chat session between the chat clients and the chat server 10, regardless of whether the client workstation of concern is connected to the channel of the chat system or not. Each of the agents 610 and 710 stores the recognized log file. Hence, even when the client workstation of concern is not connected to the channel of the chat system, the log file recognized by each agent is retained in the agent, and the agents 610 and 710 can transmit the recognized log file to the communication devices 602 and 702, respectively. Each of the agents 610 and 710 has predetermined setting conditions which define a location of the chat server 10 and the predetermined channel of the chat system.

In the embodiment of FIG. 13, only the two chat clients and the two agents are provided for the sake of simplification. However, in the communication management system according to the present invention, the number of the chat clients and the number of the agents in the chat system may be modified.

As shown in FIG. 13, the agent 610 generally has a log file recognizing part (LFR) 611, a condition storage part (CS) 612, a record reading part (RR) 613, a connection and transmission part (C/T) 614, a connection detection part (CD) 620, and a path determination part (PD) 621. Similarly, the agent 710 is configured so that the agent 710 includes the elements which are the same as corresponding elements of the agent 610. In the following, the configuration of only the agent 610 will be described for the sake of simplification, and a duplicate description of the configuration of the agent 710 will be omitted.

The LFR 611 recognizes a log file produced at a predetermined channel of the chat system during a chat session between a plurality of client workstations and a server computer even when the client workstation of concern is not connected to the predetermined channel of the chat system. The channel of the chat system to which the agent 610 is connected is predetermined by the user#1. The LFR 611 includes a storage memory (not shown) provided therein, and the LFR 611 stores the log file in the storage memory.

The CS 612 previously stores conditions input by the user#1. The stored conditions in the CS 612 are selection criteria when reading records from the log file stored by the LFR 611. The stored conditions in the CS 612 may include a specific time period, a specific keyword, or a specific username.

The RR 613 reads records from the log file, stored by the LFR 611, when the records match the conditions previously stored in the CS 612. For example, when the stored conditions include a specific time period 13:00 to 14:00, the RR 613 reads from the log file the records which are transmitted to the chat system within the time period 13:00 to 14:00, a log file containing the read records is transmitted to the communication device 602 by the agent 610.

The C/T 614 establishes a connection with the communication device when the records matching the stored conditions are read from the stored log file by the RR 613, and transmits a log file containing the read records, through the computer network to the communication device 602. When the user#1 who is at the communication device 602 receives the log file from the agent 610, the user#1 can easily understand the contents of the records in the received log file. If needed, it is possible that the user#1 returns to the client workstation and joins the chat in the chat system.

The CD 620 detects whether the chat client 600 is connected to the chat server 10.

The PD 621 selects one of two paths to the LFR 611 and the chat client 600 based on the detection of the CD 620. When the chat client 600 is connected to the chat server 10, the PD 621 passes a chat record sent by the chat server 10, to the chat client 600. When the chat client 600 is not connected to the chat server 10, the PD 621 passes a chat record sent by the chat server 10, to the LFR 611.

Figure 14:
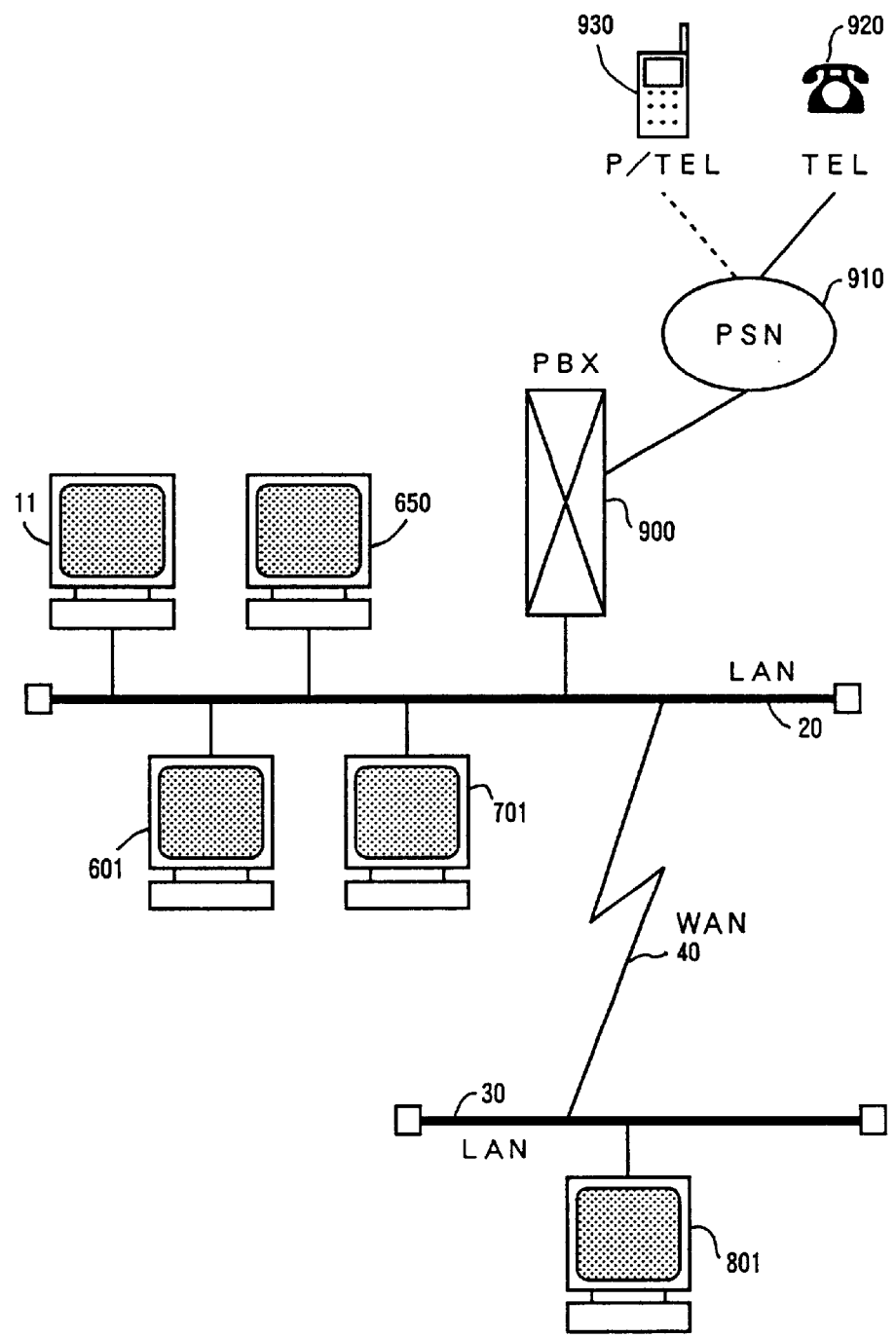
FIG. 14 is a diagram of a computer network to which the communication management system of the present embodiment is applied.

FIG. 14 shows a computer network to which the communication management system of the present embodiment is applied.

As shown in FIG. 14, the computer network, which is a local area network (LAN) 20, includes a plurality of client workstations 601 and 701, a server computer 11, and an agent computer 650 which are linked together. These computers of the LAN 20 are connected through a private branch exchange (PBX) 900 to a public switched network (PSN) 910. A telephone (TEL) 920 and a portable telephone (P/TEL) 930 are connected through the PSN 910 to the PBX 900 of the LAN 20. The TEL 920 and the P/TEL 930 can transmit information to and receive information from the computers on the LAN 20.

In the computer network of FIG. 14, the LAN 20 is connected through a wide area network (WAN) 40 to a local area network (LAN) 30. The LAN 30 includes a client workstation 801 linked thereto.

The computer network of FIG. 14 is illustrated to give a typical example of the configuration of the computer network to which the present embodiment of the invention is applied. However, the present invention is not limited to a particular configuration of the computer network of FIG. 14. It is a matter of course that the present invention is also applicable to a different computer network in which the number of LANs, the number of computers, the number of telephones, the connections thereof, and others are modified.

In the communication management system of the present embodiment, the server computer 11 acts as the chat server 10 of the chat system in FIG. 13, the agent computer 650 acts as the agents 610 and 710 of the chat system in FIG. 13, and the plurality of client workstations 601 and 701 act as the chat clients 600 and 700 of the chat system. There is the one-to-one correspondence between the agents 610 and 710 of the agent computer 650 and the chat clients 600 and 700 of the client workstations 601 and 701.

In the chat system, the agents 610 and 710 function to manage the transmission and receiving of information between the chat server 10 and the chat clients 600 and 700.

Alternatively, the agent 610 and the agent 710 may be provided in separate computers linked to the LAN 20. Further, the agent 610 and the agent 710 may be provided in the server computer 11 jointly, or in the client workstation 601 and the client workstation 701 respectively.

In the computer network of FIG. 14, a personal handy-phone system (PHS) and/or a mobile personal computer (PC) may be connected through the PSN 910 to the PBX 900 of the LAN 20. The PHS and/or the mobile PC can transmit information to and receive information from the computers on the LAN 20.

A description will now be given of an operation of the communication management system of the present embodiment.

In the following, suppose that the chat client 700 is always connected to a channel#5 of the chat system and the user#2 of the chat client 700 joins a chat among the users of the other chat clients in the chat system. The communication management system of the present embodiment functions to transmit a log file containing chat records, which match the previously stored conditions input by the user#1, through the computer network to the communication device 602 which can be accessed by the user#1.

Figure 15:
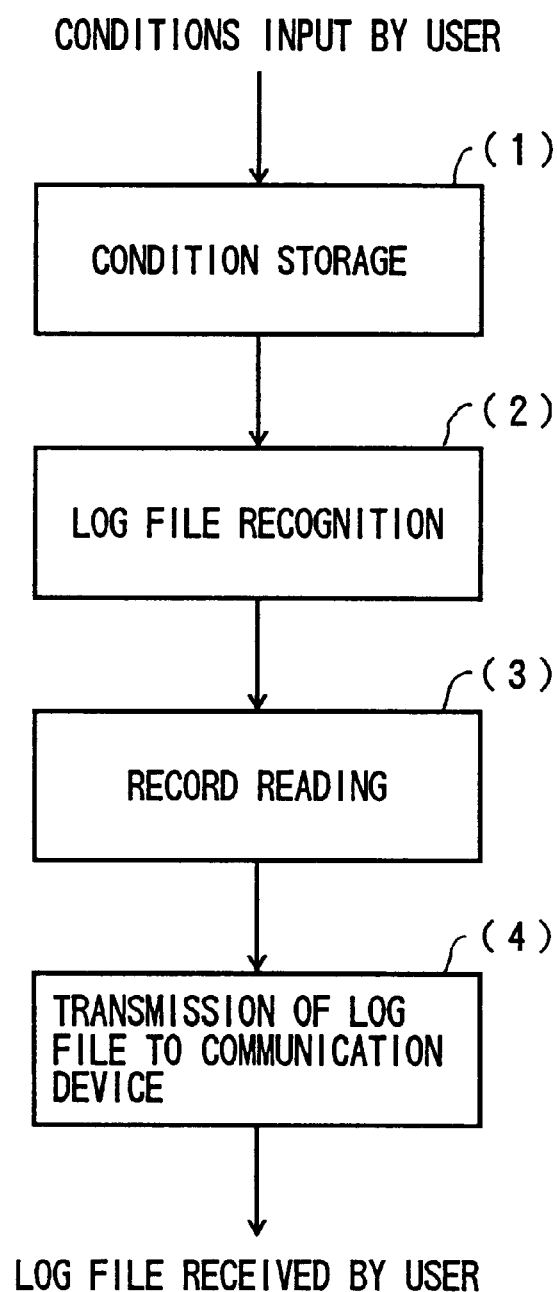
FIG. 15 is a flowchart for explaining an operation of the communication management system of the present embodiment.

FIG. 15 shows an operation of the communication management system of the present embodiment.

At first, by using an input device of the client workstation 601, the user#1 inputs conditions which are selection criteria when reading records from the stored log file. As indicated by (1) in FIG. 15, the communication management system of the present embodiment (or the CS 612 of the agent 610) stores the conditions input by the user#1. The stored conditions include, for example, a specific keyword "computer". Suppose that, after the condition storage (1) is performed, the client workstation 601 is not connected to the channel#5 of the chat system and the user#1 does not join the chat.

On the other hand, the client workstation 701 is always connected to the channel#5 of the chat system and the user#2 of the client workstation 701 continues to join the chat. Suppose that the user#2 employs a username "AAA" when joining the chat.

FIG. 16 shows an example of a log file produced by the chat system at the channel#5 in this condition. As shown in FIG. 16, each of the chat records in the log file includes a chat time field 500, a username (or nickname) field 510 and a chat text field 520.

The log file shown in FIG. 16 contains the message sent by the user#2, and it is transmitted through the agent 710 and the chat server 10 to all the client workstations connected to the channel#5 of the chat system.

As indicated by (2) in FIG. 15, the communication management system of the present embodiment (or the LFR 611 of the agent 610) recognizes the log file containing all the messages sent by the chat server 10. More specifically, in the above-described condition, the CD 620 detects that the chat client 600 is not connected to the chat server 10, and therefore the PD 621 passes the messages, sent by the chat server 10, to the LFR 611. Thus, the LFR 611 recognizes the log file produced at the channel#5 of the chat system, and the LFR 611 stores the log file in the storage memory of the LFR 611.

As indicated by (3) in FIG. 15, the communication management system of the present embodiment (or the RR 613 of the agent 610) reads records from the log file, stored by the LFR 611, when the records match the conditions previously stored in the CS 612. For example, when the stored conditions include the keyword "computer", the RR 613 reads from the stored log file the record including the keyword "computer" and a predetermined number of subsequent records. The read records are supplied to the C/T 614 by the RR 613.

As indicated by (4) in FIG. 15, the communication management system of the present embodiment (or the C/T 614 of the agent 610) establishes a connection with the communication device 602 when the record with the keyword "computer" is read from the stored log file, and transmits a log file containing the read records through the computer network to the communication device 602. Hence, when the user#1 who is at the communication device 602 receives the log file from the agent 610, the user#1 can easily understand the contents of the records in the received log file. If needed, it is possible that the user#1 returns to the client workstation 601 and joins the chat in the chat system.

In the present embodiment, the number of subsequent records read by the RR 613 in addition to the record including the keyword "computer" may be arbitrarily set. The communication management system of the present embodiment can provide easy understanding of the contents of the chat records in the log file which contain the keyword input by the user#1.

Figure 17:
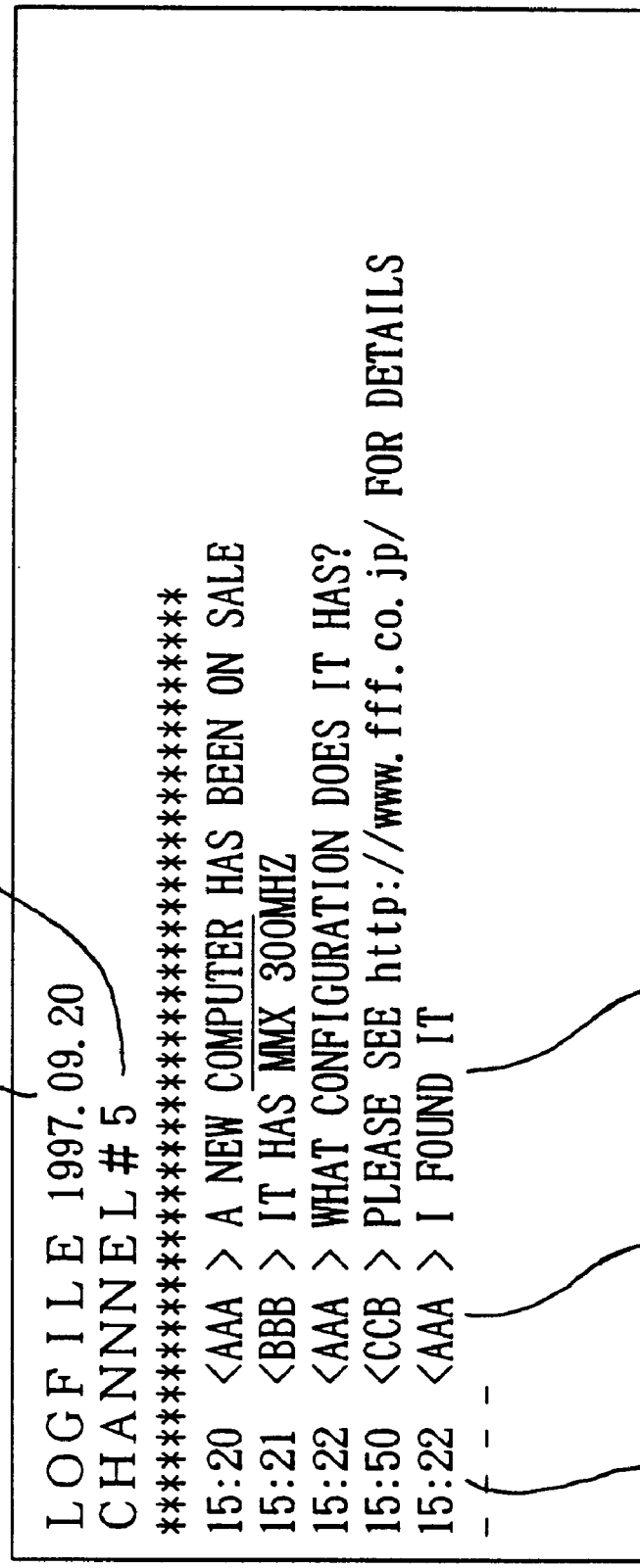
FIG. 17 is a diagram of an example of a processed log file transmitted by the communication management system of the present invention.

FIG. 17 shows an example of a processed log file transmitted by the communication management system of the present embodiment.

As shown in FIG. 17, each of the chat records in the log file includes the chat time field 500, the username (or nickname) field 510 and the chat text field 520. Further, the log file transmitted by the communication management system of the present embodiment includes a chat date 530 ("1997.09.20") and a chat channel 540 ("channel#5") in a header portion of the log file.

Hence, the user#1 is required only to input the conditions (for example, the keyword) into the CS 612 of the communication management system of the present embodiment. When the user#1 who is at the communication device 602 receives the log file from the agent 610, the user#1 can easily understand the contents of the records in the received log file. If needed, it is possible that the user#1 returns to the client workstation 601 and joins the chat in the chat system.

Figure 18:
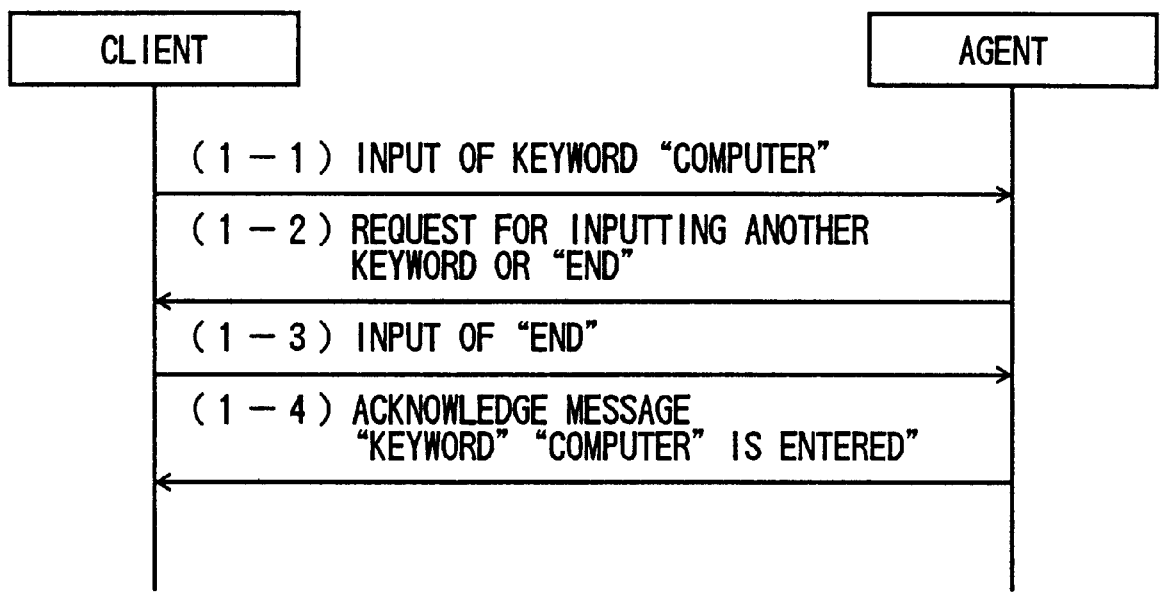
FIG. 18 is a diagram for explaining communication sequences of the communication management system when a keyword storage process is performed.

FIG. 18 shows communication sequences of the communication management system when a keyword storage process is performed.

As shown in FIG. 18, the user#1 inputs a specific keyword (for example, "computer") by using the client workstation 601 at step (1-1). The input keyword is stored by the CS 612 of the agent 610. After the first keyword storage, the agent 610 transmits a signal indicating the end of the first keyword storage to the client workstation 601. Further, the agent 610 transmits a signal indicating a request for inputting another keyword or an end command "end" to the client workstation 601 at step (1-2). When the user#1 does not input another keyword, the user#1 inputs the end command "end" by using the client workstation 601 at step (1-3). After the receiving of the end command "end", the agent 610 transmits an acknowledge message indicating that the keyword "computer" is entered, to the client workstation 601 at step (1-4). The signals transmitted to the client workstation 601 by the agent 610 may be a synthesized voice signal or text data, which depends on the model of the client workstation 601.

Figure 19:
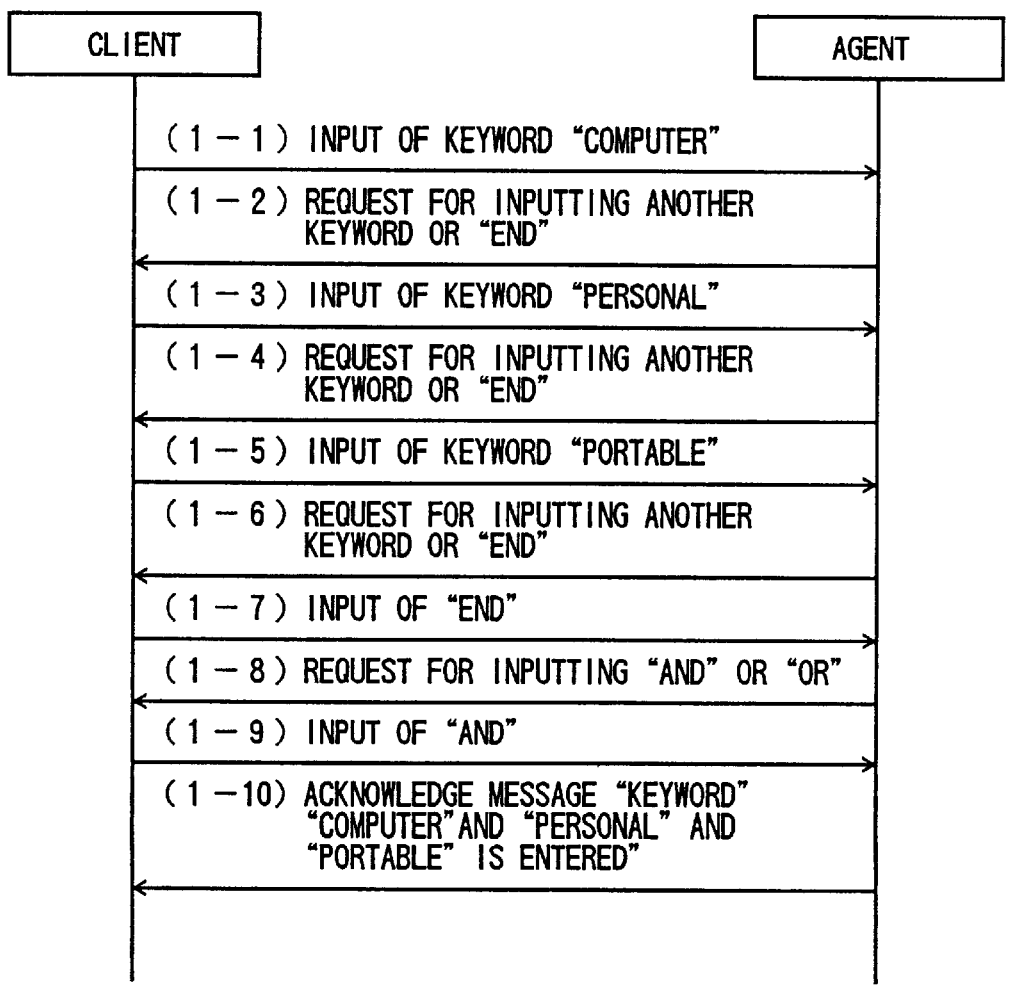
FIG. 19 is a diagram for explaining communication sequences of the communication management system when another keyword storage process is performed.

FIG. 19 shows communication sequences of the communication management system when another keyword storage process is performed.

As shown in FIG. 19, the user#1 inputs three specific keywords "computer", "personal" and "portable" by using the client workstation 601 at steps (1-1) through (1-7), similar to the steps (1-1) through (1-3) of the process of FIG. 18. The input keywords are stored by the CS 612 of the agent 610. After the multiple keyword storage, if the user#1 does not input another keyword, the user#1 inputs the end command "end" by using the client workstation 601 at step (1-7). After the receiving of the end command "end", the agent 610 transmits a signal indicating a request for inputting "and" or "or", to the client workstation 601 at step (1-8). The input of "and" by the user#1 at a following step requests the agent 610 to set the logical product of the multiple keyword. The input of "or" by the user#1 at a following step requests the agent 610 to set the logical sum of the multiple keyword.

When the user#1 inputs "and" by using the client workstation 601 at step (1-9), the agent 610 transmits an acknowledge message indicating that the input keyword "computer" and "personal" and "portable" is entered, to the client workstation 601 at step (1-10). The signals transmitted to the client workstation 601 by the agent 610 may be a synthesized voice signal or text data, which depends on the model of the client workstation 601.

Figure 20:
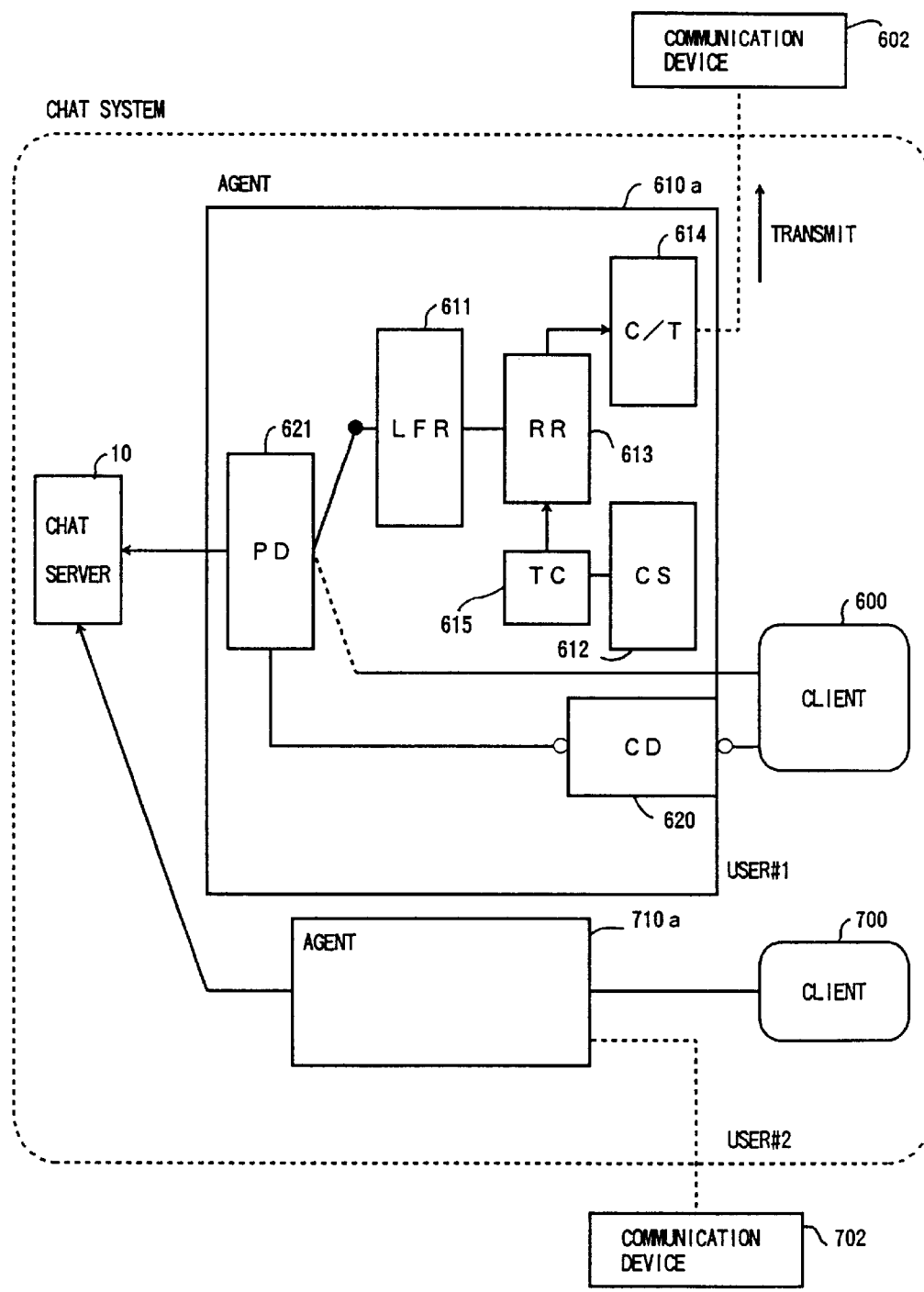
FIG. 20 is a diagram for explaining a configuration of another communication management system embodying the present invention.

FIG. 20 shows a configuration of another communication management system embodying the present invention. In FIG. 20, the elements which are the same as corresponding elements in FIG. 13 are designated by the same reference numerals, and a description thereof will be omitted.

As shown in FIG. 20, an agent 610a in the present embodiment includes a time counter (TC) 615 in addition to the elements of the agent 610 in the embodiment of FIG. 13.

The time counter (TC) 615 has an input connected to an output of the CS 612 and an output connected to the RR 613. The TC 615 has clock and timer functions, and outputs time data to the RR 613. When the stored conditions in the CS 612 include a specific time period (for example, 15:00 to 17:00) input by the user#1, the RR 613 reads, from the stored log file in the LFR 611, records which have been produced at the channel#5 of the chat system in the time period 15:00 to 17:00. In the agent 610a, the RR 613 reads such records from the stored log file in accordance with both the time data from the TC 615 and the stored conditions from the CS 612.

Similar to the embodiment of FIG. 13, the C/T 614 of the agent 610a in the present embodiment establishes a connection with the communication device 602 when the records matching the stored conditions are read from the stored log file by the RR 613, and transmits a log file containing the read records, through the computer network to the communication device 602. When the user#1 who is at the communication device 602 receives the log file from the agent 610a, the user#1 can easily understand the contents of the records (produced in the time period 15:00 to 17:00) in the received log file. Even when the user#1 is unable to join the chat in a specific time period, it is possible that the user#1 can later view the contents of the records of the log file. If needed, it is possible that the user#1 returns to the client workstation 601 and joins the chat in the chat system.

FIG. 21 shows an example of a log file produced by the chat system at the channel#5 during the time period 15:00 to 17:00. As shown in FIG. 21, each of the chat records in the log file includes the chat time field 500, the username (or nickname) field 510 and the chat text field 520.

Figure 22:
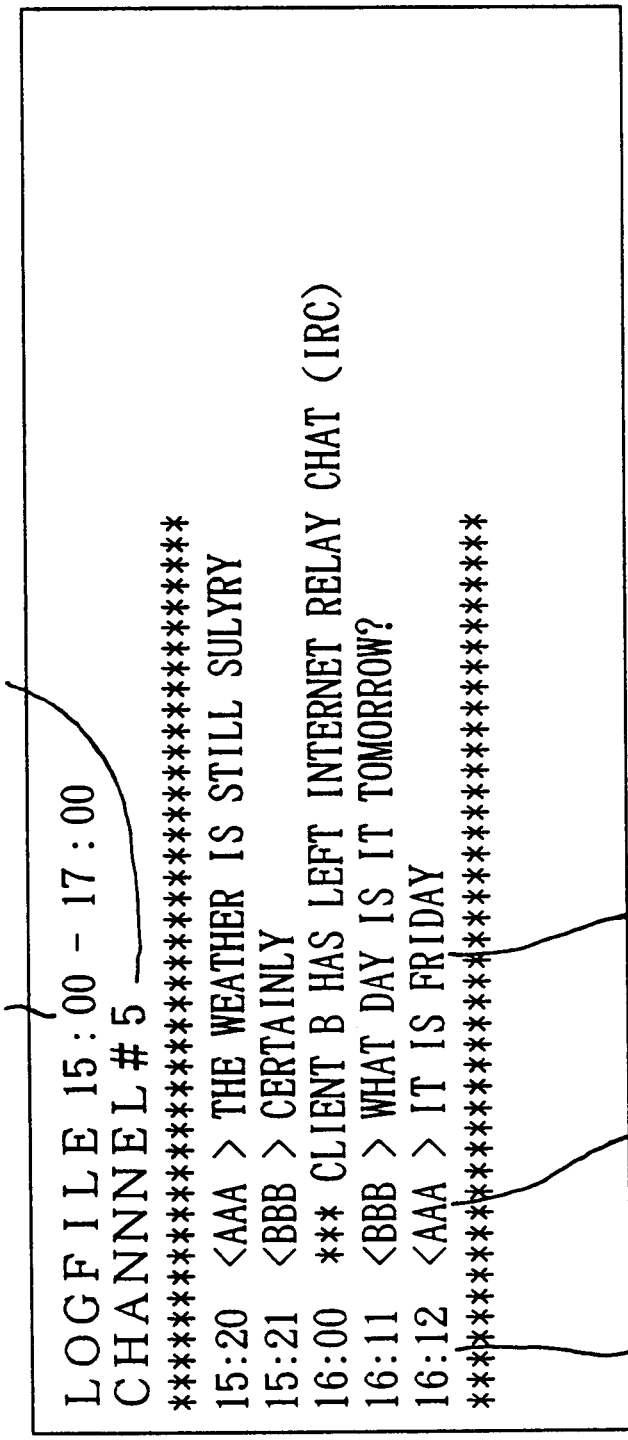
FIG. 22 is a diagram of an example of a processed log file output by the communication management system of FIG. 20.

FIG. 22 shows an example of a processed log file output by the communication management system of FIG. 20. As shown in FIG. 22, each of the chat records in the processed log file include the chat time field 500 which ranges from 15:00 to 17:00. Further, the log file transmitted by the communication management system of the present embodiment includes a record collection time period 550 ("15:00–17:00") and the chat channel 540 ("channel#5") in the header portion of the log file.

Hence, the user#1 is required only to input the conditions (a specific time period) into the CS 612 of the communication management system of the present embodiment. When the user#1 who is at the communication device 602 receives the log file from the agent 610a, the user#1 can easily understand the contents of the records in the received log file.

Figure 23:
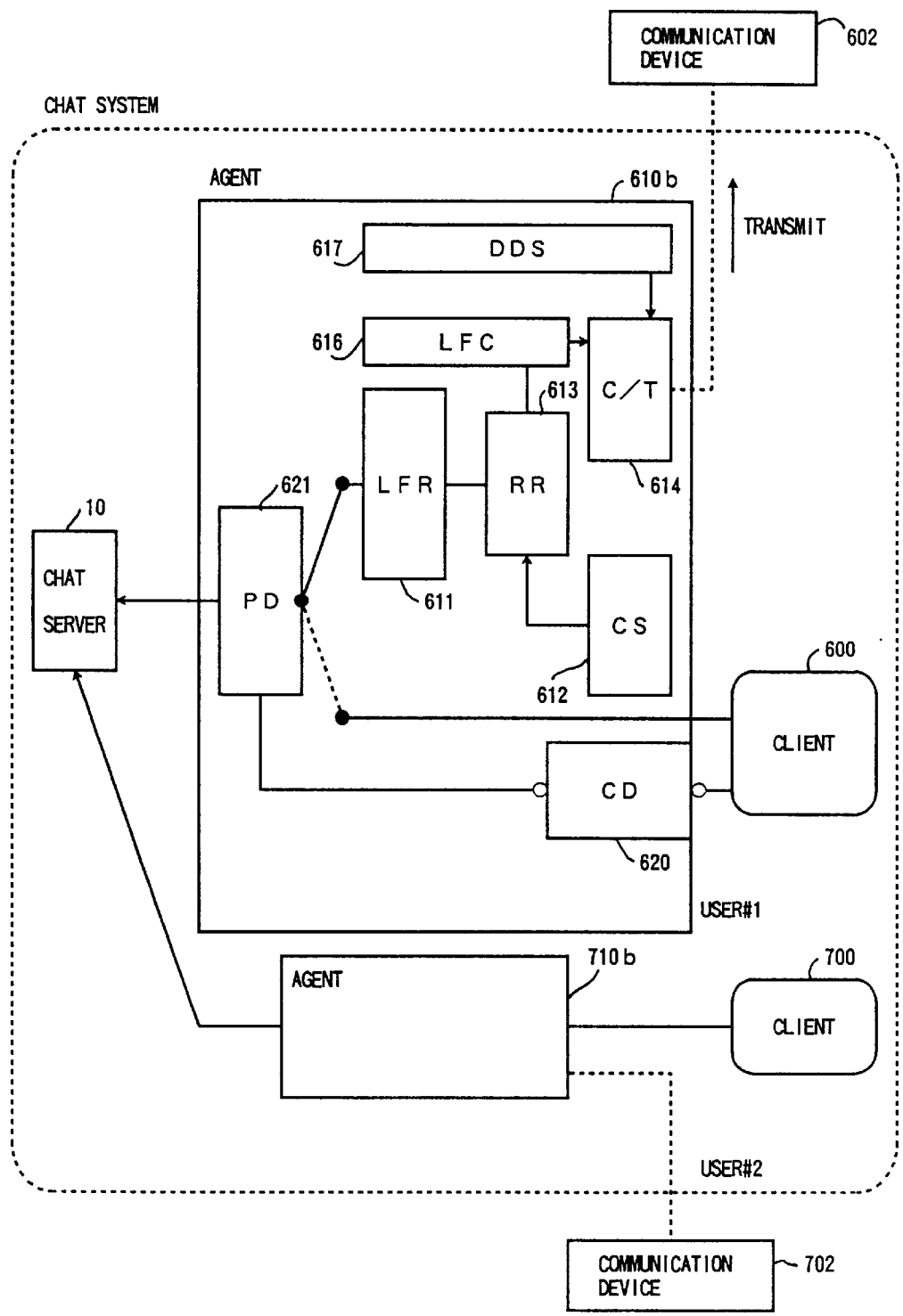
FIG. 23 is a diagram for explaining a configuration of a further communication management system embodying the present invention.

FIG. 23 shows a configuration of a further communication management system embodying the present invention. In FIG. 23, the elements which are the same as corresponding elements in FIG. 13 are designated by the same reference numerals, and a description thereof will be omitted.

As shown in FIG. 23, an agent 610b in the present embodiment includes a log file converting part (LFC) 616 and a device data storage part (DDS) 617 in addition to the elements of the agent 610 in the embodiment of FIG. 13.

The log file converting part (LFC) 616 has an input connected to an output of the RR 613 and an output connected to the C/T 614. The device data storage part (DDS) 617 has an output connected to the C/T 614. The DDS 617 stores device data of the communication device 602 to which the C/T 614 transmits the log file. The device data may be a phone number of the communication device 602. The device data may include a type of the communication device 602. The LFC 616 converts the log file containing the records read by the RR 613, into a signal detectable to the communication device 602 in accordance with the device data stored by the DDS 617. The C/T 614 transmits the signal supplied by the LFC 616, through the computer network to the communication device 602.

For example, when the communication device 602 is a computer, the LFC 616 converts the log file into text data indicating the read records in accordance with the device data of the DDS 617. When the communication device 602 is a telephone, the LFC 616 converts the log file into a synthesized voice signal indicating the read-records in accordance with the device data of the DDS 617. Further, when the communication device 602 is a pager, the LFC 616 converts the log file into a notification signal in accordance with the device data of the DDS 617, and the notification signal notifies the user#1 of the presence of the log file that can be transmitted to the client workstation.

Figure 24:
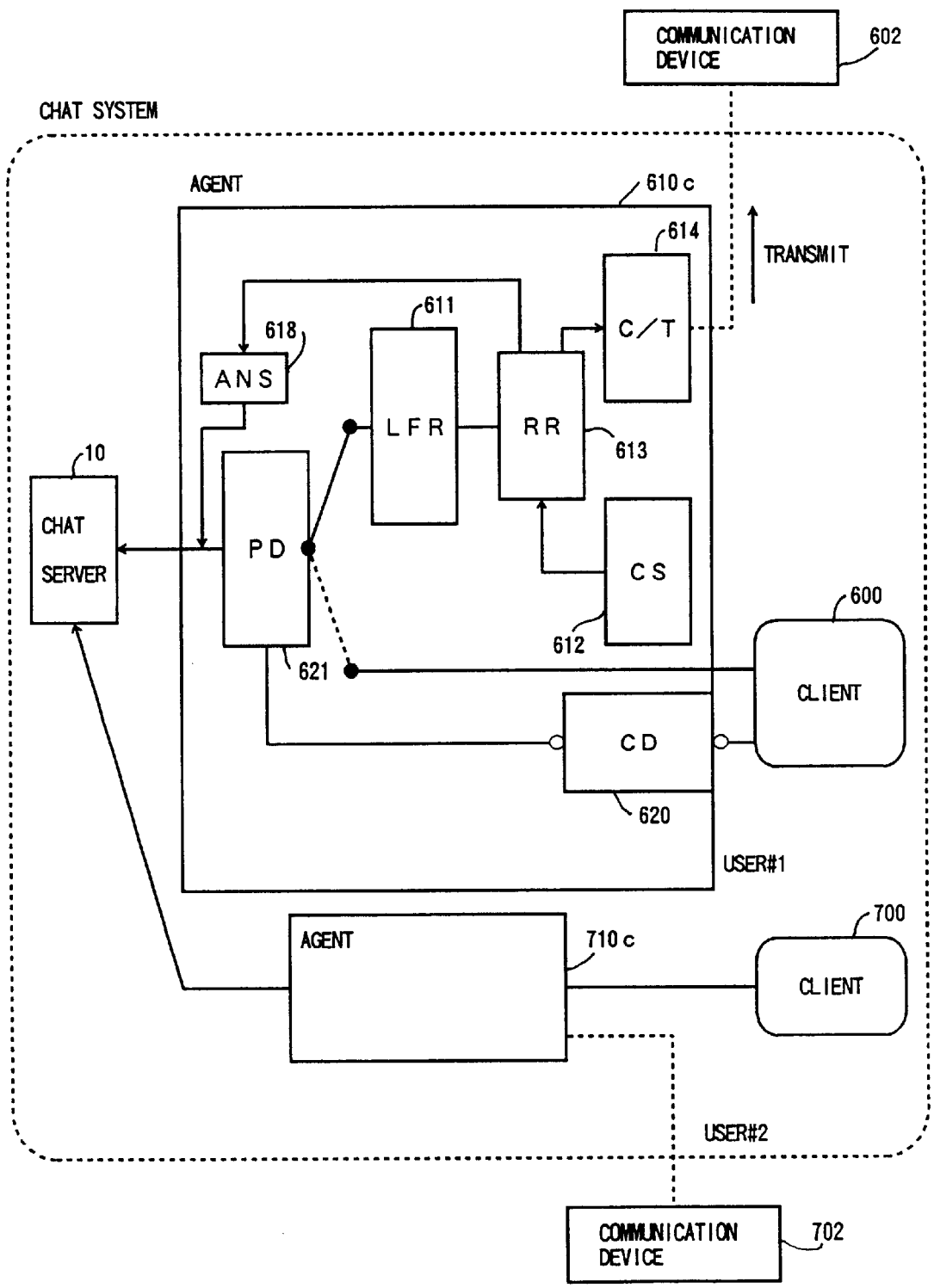
FIG. 24 is a diagram for explaining a configuration of another communication management system embodying the present invention.

FIG. 24 shows a configuration of another communication management system embodying the present invention. In FIG. 24, the elements which are the same as corresponding elements in FIG. 13 are designated by the same reference numerals, and a description thereof will be omitted.

As shown in FIG. 24, an agent 610c in the present embodiment includes an answer part (ANS) 618 in addition to the elements of the agent 610 in the embodiment of FIG. 13.

The answer part (ANS) 618 has an input connected to an output of the RR 613 and an output connected to the chat server 10. The ANS 618 transmits a predetermined message through the computer network to the chat server 10 of the server computer 11 when the client workstation 601 does not transmit a message to the channel of the chat system over a predetermined time period. When the user#1 is unable to transmit a log file to the communication device 602 or when the user#1 is unable to transmit a message to the channel of the chat system, the ANS 618 transmits a predetermined message, stored by the RR 613, to the chat server 10 on behalf of the user#1.

For example, suppose that the user#1 cuts off the connection with the chat system during a chat session at a channel#5, and thereafter the user#2 transmits a message to the user#1 through the chat server 10. The PD 621 of the agent 610c at this time is unable to pass the message of the user#2 to the client workstation 601. The ANS 618 transmits a predetermined message to the chat server 10 on behalf of the user#1, and the message transmitted by the ANS 618 indicates, for example, that the connection with the user#1 is off. The message from the ANS 618 is transmitted through the chat server 10 to all the client workstations connected to the channel#5 of the chat system.

FIG. 25 shows an example of a processed log file output by the communication management system of FIG. 24. Suppose that the user#1 has a username "EEE" and the user#2 has a username "AAA".

As shown in FIG. 25, the last record in the log file corresponds to the message transmitted by the ANS 618 of the agent 610c. The last record has the username field 510 which contains "EEE_D", which denotes that the chat text is transmitted by the ANS 618 instead of the user#1. The last record has the chat text field 520 which contains the predetermined message transmitted by the ANS 618.

Further, when the client workstation 601 does not transmit a replying message to the channel of the chat system over a predetermined time period in response to a talk from another chat client although the client workstation 601 is connected to the channel of the chat system, the ANS 618 may transmit a predetermined message to the chat server 10 on behalf of the user#1, and the message transmitted by the ANS 618 indicates, for example, that the user#1 has left the client workstation 601.

Figure 26:
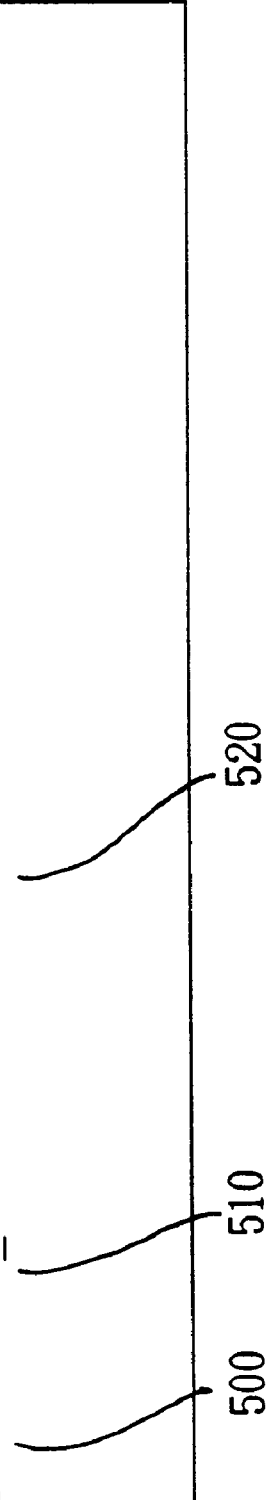
FIG. 26 is a diagram of an example of a processed log file output by the communication management system of FIG. 24.

FIG. 26 shows an example of a processed log file output by the communication management system of FIG. 24. Suppose that the user#1 has a username "EEE" and the user#2 has a username "AAA".

As shown in FIG. 26, the last record in the log file corresponds to the message transmitted by the ANS 618 of the agent 610c. The last record has the username field 510 which contains "EEE_D", which denotes that the chat text is transmitted by the ANS 618 instead of the user#1. The last record has the chat text field 520 which contains the predetermined message transmitted by the ANS 618. The message transmitted by the ANS 618 indicates, for example, that the user#1 has left the client workstation 601.

In the present embodiment, the time period until the ANS 618 transmits the predetermined message since the receipt of the message to the client workstation 601 may be arbitrarily set. The communication management system of the present embodiment can provide increased convenience for the plural users when using the chat system.

Figure 27:
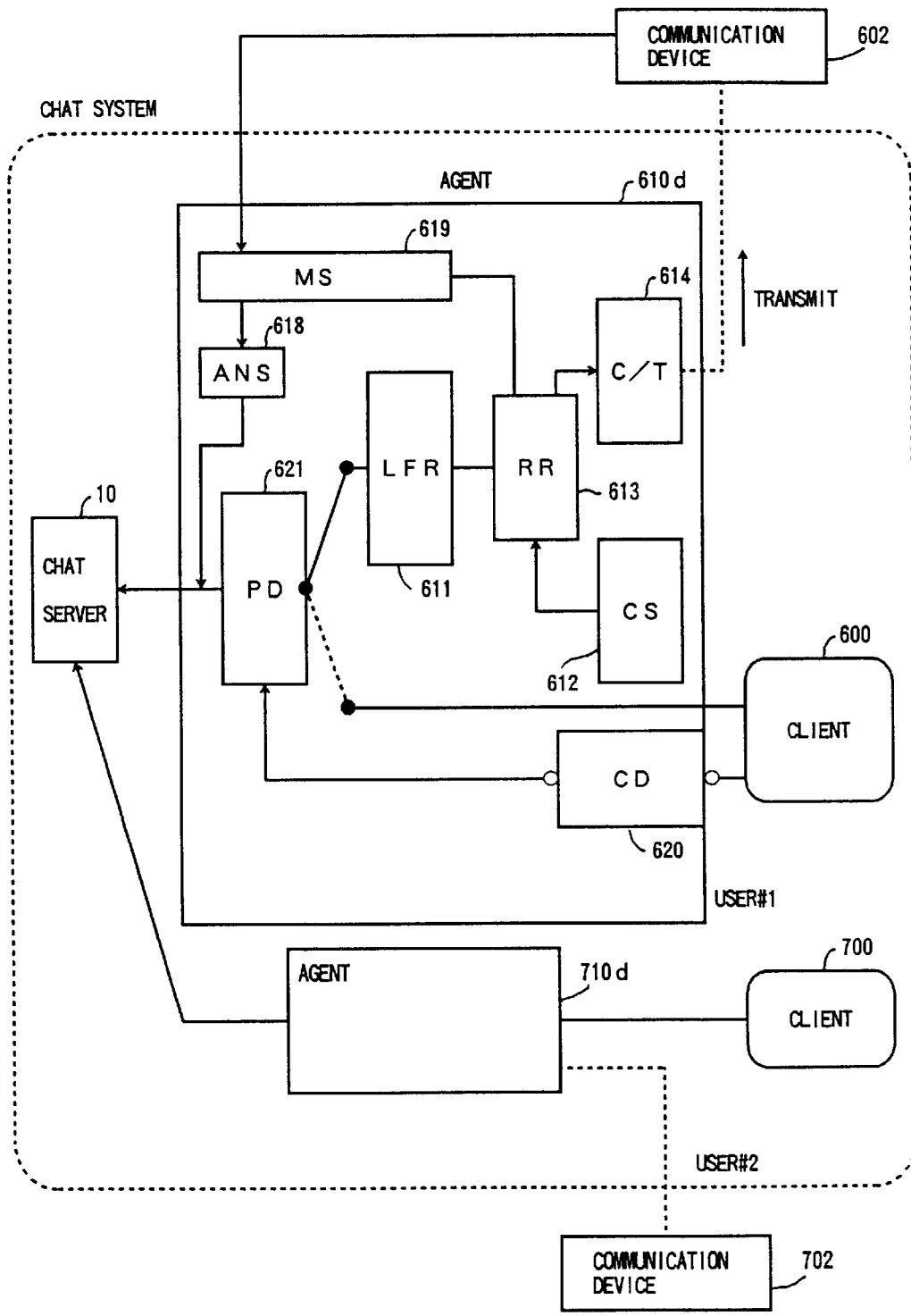
FIG. 27 is a diagram for explaining a configuration of a further communication management system embodying the present invention.

FIG. 27 shows a configuration of a further communication management system embodying the present invention. In FIG. 27, the elements which are the same as corresponding elements in FIG. 24 are designated by the same reference numerals, and a description thereof will be omitted.

As shown in FIG. 27, an agent 610d in the present embodiment includes a message storage part (MS) 619 in addition to the elements of the agent 610c in the embodiment of FIG. 24.

The message storage part (MS) 619 has an input connected to an output of the RR 613, an input connected to the communication device 602, and an output connected to the ANS 618. The MS 619 previously stores a predetermined message which is prepared for a specific username. In the agent 610d, when the record reading part (RR) 613 detects that a record in the log file matches the previously stored conditions, the ANS 618 transmits the predetermined message, stored by the MS 619, through the computer network to one of the client workstations corresponding to the specific username.

Suppose that the specific username is the user#2, and the predetermined message stored in the MS 619 includes an access method (for example, a phone number of the communication device 602) to access the user#1 or a message previously stored by the user#1 when the user#1 leaves the client workstation 601 and is at a remote place where the communication device 602 is located. When a message is transmitted to the user#1 by the user#2 during a chat session of the chat system but the user#1 leaves the chat system, the RR 613 detects that there is the message sent to the user#1 by the user#2 in the log file. The ANS 618 in such a case transmits the predetermined message, stored by the MS 619, through the computer network to the client workstation 701. Hence, when the message of the ANS 618 is received, the user#2 speedily recognizes that the user#1 has left the client workstation 601 and he is able to access the user#1 by using the access method indicated by the received message.

FIG. 28 shows an example of a processed log file output by the communication management system of FIG. 27. Suppose that the user#1 has a username "EEE" and the user#2 has a username "AAA".

As shown in FIG. 28, the last two records in the log file correspond to the message transmitted by the ANS 618 of the agent 610d. The last records have the username field 510 which contains "EEE_D", which denotes that the chat text is transmitted by the ANS 618 instead of the user#1. The last record has the chat text field 520 which contains the message (or the access method "*_**" indicated in FIG. 28) transmitted by the ANS 618.

Therefore, the communication management system of the present embodiment can provide increased convenience for the plural users when using the chat system.

In the above-described embodiments, part of the elements 611 through 619 of the agent may be provided in a separate module with the agent, and the separate module and the agent may be connected to the chat system. Alternatively, part of the elements 611 through 619 of the agent may be provided in the chat server 10 or the client workstation 601.

In the above-described embodiments, the ANS part 618 is provided in the agent 610c of FIG. 24 and the agent 610d of FIG. 27, and the TC 615 is provided in the agent 610a of FIG. 20. However, the communication management system according to the present invention is not limited to these embodiments. For example, the ANS part 618 and the TC 615 may provided in the same agent. Variations and modifications may be made without departing from the scope of the present invention.

In the above-described embodiments, the LFR 611 corresponds to log file recognizing means and storage means in the claims, the RR 613 corresponds to record reading means in the claims, and the C/T 614 corresponds to log file output means in the claims. Further, the LFC 616 corresponds to log file converting means in the claims, and the MS 619 corresponds to message storage means in the claims.

Further, the present invention is not limited to the above-described embodiments, and variations and modifications may be made without departing from the scope of the present invention.

The present invention is based on both Japanese patent application No. 10-048101, filed on Feb. 27, 1998, and Japanese patent application No. 10-072884, filed on Mar. 20, 1998, the entire contents of which are hereby incorporated by reference.

What is claimed is:

1. A communication management system for a chat system provided in a computer network including a plurality of client workstations and a server computer linked thereto, comprising:

log file recognizing means for recognizing a log file produced at a predetermined channel of the chat system during a chat session between the plurality of client workstations and the server computer even when the client workstation of concern is not connected to the predetermined channel of the chat system;

storage means for storing the log file recognized by the log file recognizing means; and log file output means for transmitting the log file, stored by the storage means, through the computer network to an external communication device outside the chat system when a log file request transmitted by the external communication device is received by the log file output means, wherein the log file recognizing means, the storage means and the log file output means are provided in an agent connected via the computer network between the server computer and one of the plurality of client workstations, and said agent receives the log file request from the external communication device and transmits the stored log file from the log file output means to the external communication device through the computer network.

2. The communication management system according to claim 1, further comprising user authentication means, coupled to the log file output means, for performing an authentication of a user of the external communication device before transmitting the log file to the external communication device.

3. The communication management system according to claim 1, further comprising record processing means, coupled to the log file output means, for processing the log file in accordance with output conditions transmitted by the external communication device, and the log file output means transmits the processed log file supplied by the record processing means, to the external communication device.

4. The communication management system according to claim 3, wherein the record processing means sets selection criteria with respect to records of the log file based on the output conditions transmitted by the external communication device, searches records of the log file that match the selection criteria, and supplies the processed log file in which the matching records are arranged in a form in accordance with the output conditions.

5. The communication management system according to claim 4, wherein the record processing means sets selection criteria including a specific chat server based on the output conditions transmitted by the external communication device.

6. The communication management system according to claim 4, wherein the record processing means sets selection criteria including a specific chat channel based on the output conditions transmitted by the external communication device.

7. The communication management system according to claim 4, wherein the record processing means sets selection criteria including a specific time period based on the output conditions transmitted by the external communication device.

8. The communication management system according to claim 4, wherein the record processing means sets selection criteria including a specific username based on the output conditions transmitted by the external communication device.

9. The communication management system according to claim 4, wherein the record processing means sets selection criteria including a specific character string based on the output conditions transmitted by the external communication device.

10. The communication management system according to claim 4, wherein the record processing means sets selection criteria including a specific character string and the number of selection records before and after a record containing the specific character string, based on the output conditions transmitted by the external communication device.

11. The communication management system according to claim 3, wherein the record processing means processes the log file in accordance with the output conditions, such that the records in the processed log file have different fonts depending on individual usernames of the records.

12. The communication management system according to claim 3, wherein the record processing means processes the log file in accordance with the output conditions, such that the records in the processed log file have different character sizes depending on individual usernames of the records.

13. The communication management system according to claim 3, wherein the record processing means processes the log file in accordance with the output conditions, such that the records in the processed log file have different colors depending on individual usernames of the records.

14. The communication management system according to claim 3, wherein the record processing means converts text data contained in each of records of the log file into a synthesized voice signal, and the log file output means transmits the synthesized voice signal supplied by the record processing means, to the external communication device.

15. The communication management system according to claim 14, wherein the record processing means processes the log file in accordance with the output conditions, such that the synthesized voice signals of the processed log file are different from each other depending on individual usernames of the records of the log file.

16. A communication management system for a chat system provided in a computer network including a plurality of client workstations and a server computer linked thereto, comprising:

log file recognizing means for recognizing a log file produced at a predetermined channel of the chat system during a chat session between the plurality of client workstations and the server computer even when the client workstation of concern is not connected to the predetermined channel of the chat system;

storage means for storing the log file recognized by the log file recognizing means;

record reading means for reading records from the log file, stored by the storage means, when the records match previously stored conditions; and log file output means for establishing a connection with a communication device when the records are read by the record reading means, and the log file output means transmitting a log file containing the read records, through the computer network to the communication device, wherein the log file recognizing means, the storage means, the record reading means and the log file output means are provided in an agent connected via the computer network between the server computer and one of the plurality of client workstations, and said agent reads the records from the stored log file when the records match the previously stored conditions, and transmits the log file containing the read records from the log file output means to the communication device through the computer network by establishing the connection with the communication device.

17. The communication management system according to claim 16, wherein the communication device is one of the plurality of client workstations, and the log file output means transmits the log file containing the read records, through the computer network to said one of the plurality of client workstations.

18. The communication management system according to claim 16, wherein the log file output means includes destination storage means for previously storing a location of the communication device, and, when the records are read by the record reading means, the log file output means establishes a connection with the communication device the location of which is stored by said destination storage means.

19. The communication management system according to claim 16, wherein, when the stored conditions include a specific time period, the record reading means reads, from the stored log file, records which have been produced within the specific time period.

20. The communication management system according to claim 16, wherein, when the stored conditions include a specific keyword, the record reading means reads, from the stored log file, records which contain the specific keyword.

21. The communication management system according to claim 16, further comprising log file converting means for converting the log file containing the records read by the read reading means, into a signal detectable to the communication device, wherein the log file output means transmits the signal supplied by the log file converting means, through the computer network to the communication device.

22. The communication management system according to claim 16, further comprising:

message storage means for storing a predetermined message prepared for a specific username; and answer means for transmitting the predetermined message, stored by the message storage means, through the computer network to one of the client workstations corresponding to the specific username, wherein, when the record reading means detects that a record in the log file matches the previously stored conditions, the answer means transmits the stored message through the computer network to one of the client workstations corresponding to the specific username.

23. The communication management system according to claim 16, further comprising answer means for transmitting a predetermined message through the computer network to the server computer when the client workstation of concern does not transmit a message to the channel of the chat system over a predetermined time period.

* * * * *